United States Patent [19]
Ogawa et al.

[11] Patent Number: 6,147,938
[45] Date of Patent: Nov. 14, 2000

[54] VEHICLE ELECTRONIC SYSTEM

[75] Inventors: Norifumi Ogawa; Masaki Matsumoto; Ryoji Ohe; Masayoshi Takahashi; Toshifumi Ikeda; Yoshiaki Hirasa; Akihiro Fujiwara, all of Hiroshima-ken, Japan

[73] Assignee: Mazda Motor Corporation, Hiroshima-ken, Japan

[21] Appl. No.: 09/384,522

[22] Filed: Aug. 27, 1999

[30] Foreign Application Priority Data

Sep. 11, 1998 [JP] Japan .................................. 10-258664
Apr. 9, 1999 [JP] Japan .................................. 11-102377

[51] Int. Cl.[7] .............................. H04B 1/20; H04B 1/00
[52] U.S. Cl. .................................. 369/12; 369/2; 381/86; 455/348
[58] Field of Search ................................ 369/12, 2, 6, 7, 369/10, 11, 75.1, 75.2; 455/347, 345, 348; 381/86

[56] References Cited

U.S. PATENT DOCUMENTS

| 4,513,405 | 4/1985 | Hills . |
| 5,127,057 | 6/1992 | Chapman . |
| 5,815,468 | 9/1998 | Muramatsu et al. ........................ 369/2 |
| 5,862,468 | 1/1999 | Kim ......................................... 455/346 |
| 5,864,627 | 1/1999 | Kim ......................................... 381/86 |

FOREIGN PATENT DOCUMENTS

| 4043724 | 2/1992 | Japan . |
| 08295181 | 11/1996 | Japan . |
| 09286287 | 11/1997 | Japan . |
| 09289689 | 11/1997 | Japan . |
| 10272993 | 10/1998 | Japan . |

*Primary Examiner*—Ali Neyzari
*Attorney, Agent, or Firm*—Brooks & Kushman P.C.

[57] ABSTRACT

A projection (41) protrudes downward from the lower side edge portion of a third electronic control unit (40). The projection forms a recess which houses a first electronic control unit (20) under the third electronic control unit (40) and has a lower opening. The third electronic control unit (40) and a control panel (10) are electrically connected to each other via connectors (13, 43). A second electronic control unit (30) is placed on the upper surface of the third electronic control unit (40), and the first and third electronic control units (20, 40) and the second and third electronic control units (30, 40) are respectively detachably connected to each other via connectors.

20 Claims, 37 Drawing Sheets

F I G. 15
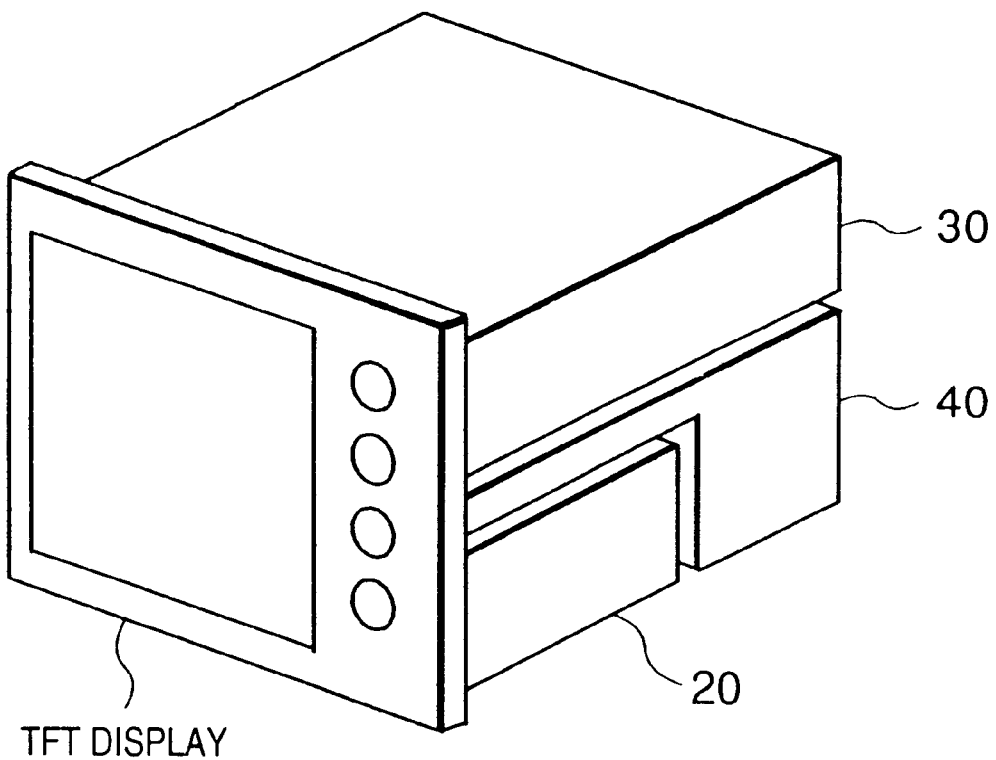

FIG. 19
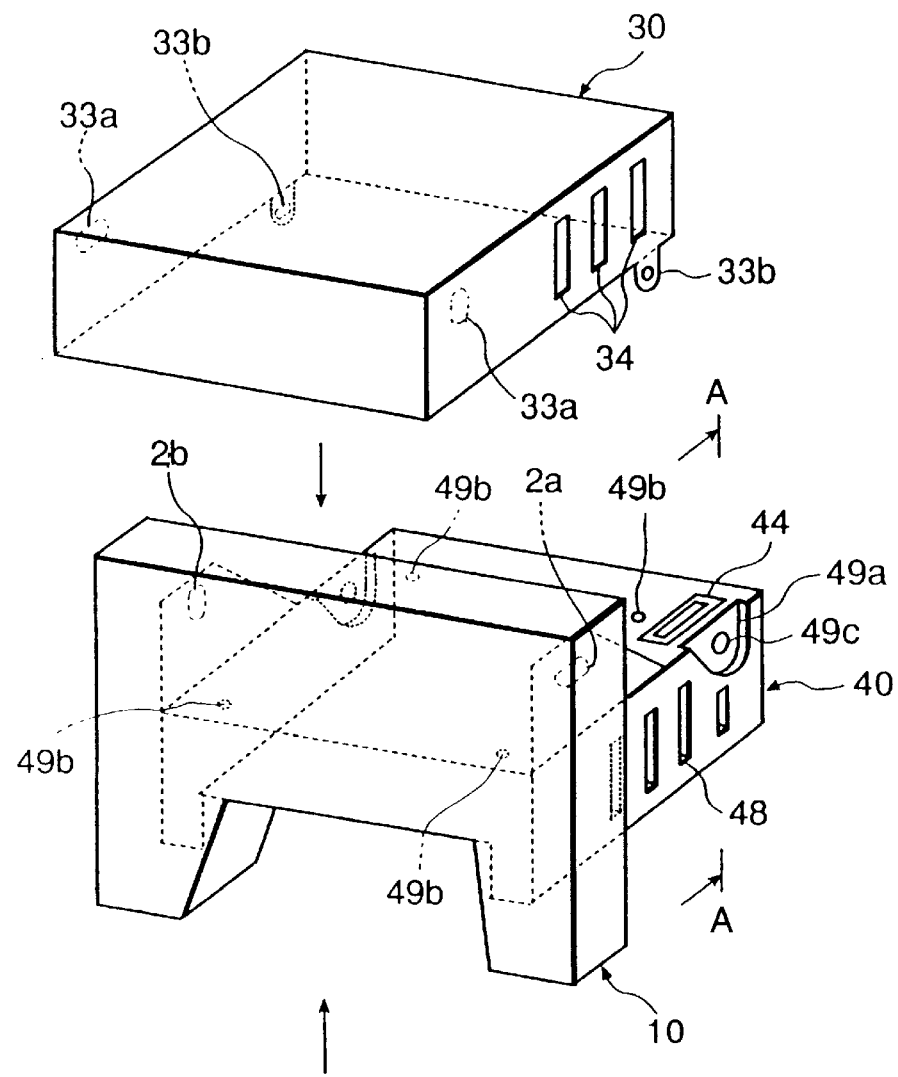
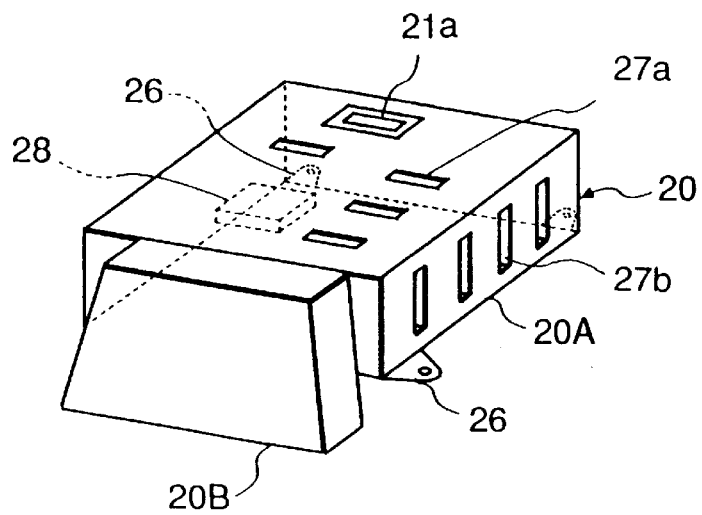

VEHICLE ELECTRONIC SYSTEM

BACKGROUND OF THE INVENTION

1. Field of the Invention

The present invention relates to a vehicle electronic system and, more particularly, to a vehicle electronic system which can perform concentrated control of a cassette tape, CD, MD, and the like at a control panel.

2. Description of Related Art

U.S. Pat. No. 5,127,057 proposes an automotive electronic control unit which comprises a control panel for making control inputs and displays pertaining to a plurality of sound modules, a sound module selected from a plurality of types of sound modules, and a main module incorporating a radio tuner, and connects the control panel, sound module (only one module), and main module (incorporating a sound module) via a shared bus line, and in which the main module controls use of the shared bus line.

Also, Japanese Laid-Open Patent No. 9-289689 proposes a structure which has a control panel, which is common to a plurality of sound modules and performs concentrated control and display of these sound modules.

However, in the structure of U.S. Pat. No. 5,127,057, since the control panel, sound module, and main module are connected via the shared bus line, and signals are directly transmitted between, e.g., the control panel and sound module, the main module can only control the use state of the shared bus line, and cannot perform concentrated control of the entire vehicle electronic system that includes transmission of control signals and display signals.

In addition, since only two electronic control units can be placed on the side of the control panel opposite to the interior of the passenger room, the functions of the vehicle electronic system as a whole cannot be further expanded.

On the other hand, in the structure of Japanese Laid-Open Patent No. 9-289689, a plurality of electronic control units are separately placed with respect to a control unit which performs concentrated control of these electronic control units, and a storage medium inserted into the electronic control unit is ejected into the passenger room through the electronic control unit. For this reason, a through hole must be formed on the electronic control unit, thus disturbing a cost reduction and space savings. In the structure of Japanese Laid-Open Patent No. 9-289689, the plurality of electronic control units are not detachably connected via connectors. When these electronic control units are detached, the through hole becomes an idle space. Or when these electronic control units are replaced by other ones, and the size or insertion position of the storage medium changes, the electronic control unit must be replaced together with the control panel.

SUMMARY OF THE INVENTION

The present invention has been made to solve the aforementioned problems, and has as its object to provide a vehicle electronic system which can achieve high concentrated control performance, easy function expandability or exchangeability, a cost reduction, and space savings of the vehicle electronic system.

In order to solve the above problems and to achieve the object, a vehicle electronic system according to the first aspect comprises the following arrangement.

That is, a vehicle electronic system comprises a first electronic control unit having a predetermined first control function, a second electronic control unit, which is formed independently of the first electronic control unit, and has a predetermined second control function different from the first control function, the second control function including a function of reading out information from a storage medium inserted from a passenger room side, and the second electronic control unit having an insertion hole for inserting the storage medium, a control panel, which is formed independently of the first and second electronic control units, comprises, on the passenger room side, a plurality of control switches for operating individual control functions pertaining to the first and second electronic control units, and a display device for making display of the individual control functions pertaining to the first and second electronic control units, and has a communication hole for inserting the storage medium in correspondence with the insertion hole, a third electronic control unit, which is formed independently of the first and second electronic control units and the control panel, selects one of the control functions of the first and second electronic control units when one of the control switches is operated, outputs a control signal for operating the control function of the selected electronic control unit to the selected electronic control unit, and outputs a display control signal for making the display device of the control panel display upon receiving a display signal from one of the first and second electronic control units, and electrical connection means for electrically connecting between the first to third electronic control units, and the control panel, the first to third electronic control units being laid out adjacent to and parallel to each other on a side opposite to the passenger room of the control panel, wherein the third electronic control unit is laid out to be parallel to the first and second electronic control unit so as not to disturb a path between the insertion hole of the second electronic control unit and the communication hole of the control panel, and the electrical connection means independently comprises a first line for detachably connecting the first and third electronic control units via a connector, a second line for detachably connecting the second and third electronic control units via a connector, and a third line for connecting the control panel and the third electronic control unit.

In the vehicle electronic system according to the second aspect, the third electronic control unit is laid out at a position between the first and second electronic control units.

The vehicle electronic system according to the third aspect further comprises a base chassis detachably fixed to a vehicle body, and wherein each of the control panel, and the first and second electronic control units is detachably fixed to the base chassis.

In the vehicle electronic system according to the fourth aspect, a projection which protrudes from a position near an end portion opposite to the passenger room toward a side where the first electronic control unit is placed is formed on the third electronic control unit, and forms a recess for housing the first electronic control unit in the neighborhood of the third electronic control unit.

In the vehicle electronic system according to the fifth aspect, the first to third electronic control units are vertically stacked to be parallel to each other on that side of the control panel, which is opposite to the passenger room, the projection protrudes downward from the position near that end portion of the third electronic control unit, which is opposite to the passenger room, and the projection forms the recess for housing the first electronic control unit under the third electronic control unit.

In the vehicle electronic system according to the sixth aspect, the third line detachably connects the control panel and the third electronic control unit via a connector.

In the vehicle electronic system according to the seventh aspect, a passenger room-side surface of the first electronic control unit has one of a first display unit and an insertion hole for inserting a storage medium from which the first electronic control unit reads out information, and one of the first display unit and insertion hole is laid out in the neighborhood of a passenger room-side surface of the control panel, and faces the interior of the passenger room to be substantially flush with the control panel surface.

In the vehicle electronic system according to the eighth aspect, a connector for connecting the third electronic control unit to the vehicle body is provided to the projection.

In the vehicle electronic system according to the ninth aspect, a connector to be electrically connected to the second electronic control unit is provided to an upper surface of the projection of the third electronic control unit.

In the vehicle electronic system according to the 10th aspect, the vehicle electronic system is laid out at a position between a driver seat and passenger sheet in an instrument panel, the control function of the first electronic control unit includes a function of reading out information from a storage medium inserted from the passenger room side, and the storage medium inserted into the first electronic control unit is smaller than a storage medium inserted into the second electronic control unit.

In the vehicle electronic system according to the 11th aspect, the connector of the first line is a first connector which is mounted on one surface of a circuit board built in the third electronic control unit and is to be electrically connected to the first electronic control unit, and the connector of the second line is a second connector which is mounted on the other surface of the circuit board and is to be electrically connected to the second electronic control unit.

In the vehicle electronic system according to the 12th aspect, the first to third electronic control units are vertically stacked to be parallel to each other on that side of the control panel, which is opposite to the passenger room, the base chassis has an open upper end and a lower end, and the first and second electronic control units are attached from above and below the base chassis.

In the vehicle electronic system according to the 13th aspect, the control function of the first electronic control unit has a function of reading out information from a storage medium inserted from the passenger room side, the first electronic control unit has a second insertion hole for inserting a storage medium from which the first electronic control unit reads out information, the control panel has a second communication hole for inserting the storage medium in correspondence with the second insertion hole, and the third electronic control unit is laid out to be parallel to the first and second electronic control units so as not to disturb a path between the second insertion hole of the first electronic control unit and the second communication hole of the control panel.

In the vehicle electronic system according to the 14th aspect, the base chassis has a reference attachment portion serving as a reference position upon attaching the first and second electronic control units, and an error allowing attachment portion which is formed at a position different from the reference attachment portion and allows a position error of the first and second electronic control units, and a connector of at least one of the first and second electronic control units is placed to be closer to the reference attachment portion than the error allowing attachment portion.

In the vehicle electronic system according to the 15th aspect, a heat radiation hole is formed on a housing of the first electronic control unit laid out under the third electronic control unit, and the heat radiation hole is formed at a position except for a portion corresponding to a control arithmetic unit built in the first electronic control unit.

In the vehicle electronic system according to the 16th aspect, a heat radiation hole is formed on a side surface of a housing of the first electronic control unit, and a heat radiation hole is formed on a side surface of the projection of the third electronic control unit at a position corresponding to the heat radiation hole of the first electronic control unit.

In the vehicle electronic system according to the 17th aspect, the first and second electronic control units respectively comprise drive means for driving storage media to read predetermined data from the storage media, and the third electronic control unit does not comprise any drive means for driving a storage medium to read predetermined data from the storage medium.

In the vehicle electronic system according to the 18th aspect, the third electronic unit incorporates at least a radio tuner.

In the vehicle electronic system according to the 19th aspect, the third electronic control unit comprises a circuit board, and a central processing unit for outputting the control signal and display control signal, and the radio tuner are laid out on the circuit board.

In the vehicle electronic system according to the 20th aspect, the first to third electronic control units are vertically stacked to be parallel to each other on that side of the control panel, which is opposite to the passenger room, and the third electronic control unit is placed below the first and second electronic control units.

As a more preferred first embodiment, the first connector engaging with the connector of the third electronic control unit is provided to one surface of the second electronic control unit, and the second connector for electrically connecting the fourth electronic control unit is provided to the other surface of the second electronic control unit, which opposes one surface thereof. With these connectors, functions can be easily expanded.

As a more preferred second embodiment, the first and second connectors are provided at nearly the same positions on the opposing surfaces. With this structure, even when the first or second electronic control unit is not attached, the fourth and third electronic control units can directly engage with each other via the connectors, and can be electrically connected to each other, thus improving the degree of freedom in connections.

As a more preferred third embodiment, the system comprises fixing means for directly fixing and holding the circuit board built in the third electronic control unit, and that built in the first or second electronic control unit. With this structure, even when vibration has been produced, since the circuit boards are directly fixed to each other, the connectors can be prevented from being overloaded due to vibration. A method of supporting a connector itself in a floating state or the like is known to those who are skilled in the art, but the floating structure must support a very small connector in a floating state, resulting in increased cost. However, the structure of the present invention can take a measure against vibration with lower cost than the floating structure.

As a more preferred fourth embodiment, at least one of the first and second electronic control units is supported by the base chassis via an elastic member to be slightly displaceable with respect to the third electronic control unit. With this structure, even when vibration has been produced, since the circuit boards are directly fixed to each other, the connectors can be prevented from being overloaded due to vibration. A method of supporting a connector itself in a floating state or the like is known to those who are skilled in the art, but the floating structure must support a very small connector in a floating state, resulting in increased cost. However, the structure of the present invention can take a measure against vibration with lower cost than the floating structure.

As a more preferred fifth embodiment, the allowable error width of the elastic member along the fitting direction of the connector of at least one of the first and second electronic units, and the connector of the third electronic control unit is set to be smaller than that in directions other than the fitting direction. Any deviations in a direction that does not require a large allowable width upon fitting the connectors can be reduced to improve the attachment strength.

As a more preferred sixth embodiment, the system comprises determination means for determining if a combination of the third electronic control unit and at least one of the first and second electronic control units is the one registered in advance, and the determination means communicates with the third electronic control unit and at least one of the first and second electronic control units to inhibit execution of a control function of at least one of the first and second electronic control units. With this structure, even when one of the first to third electronic control units is stolen, the control function of that unit is inhibited from being executed, thus providing a burglarproof function.

As a more preferred seventh embodiment, the determination means is provided to the third electronic control unit. With this arrangement, determination by the determination means can be made very easily.

As a more preferred eighth embodiment, the system comprises a cover that houses the first to third electronic control units. With this cover, the influences on attachment on the vehicle depending on the presence/absence of attachment of the first and second electronic control units can be minimized.

According to the first aspect, since the third electronic control unit is placed parallel to the first and second electronic control units on that side of the control panel, which is opposite to the interior of the passenger room so as not to disturb the path between the insertion hole of the second electronic control unit and the communication hole of the control panel, and they are detachably connected using a plurality of lines via independent connectors to have the third electronic control unit as the center, high concentrated control performance, easy function expandability or exchangeability, a cost reduction, and space savings of the vehicle electronic system can be achieved.

According to the second aspect, since the third electronic control unit is placed between the first and second electronic control units and is electrically connected thereto via the connectors, the first and second electronic control units can be laid out to sandwich the third electronic control unit therebetween, thus improving the degree of freedom in layout and allowing very easy connections.

Also, efficient heat radiation performance, especially, easy assembly in terms of their electrical connections between the third electronic control unit and the first and second electronic control units, and downsizing of the vehicle electronic system itself can be achieved. Moreover, even when the size of the first or second electronic control unit increases, the system can be assembled without any problem.

More specifically, in a system in which a central control unit (third electronic control unit) is placed at the end of the system, (1) when the first and second electronic control units have a large thickness, the first or second electronic control unit largely extends to one side of the vehicle electronic system since it is not preferable to change the position of the central control unit, but it is difficult to assure a certain space in an instrument panel so as to accommodate a first or second electronic control unit which has an increased size; and (2) when the thickness of the electronic control unit placed at the center becomes large, since the attachment position itself of the electronic control unit located on the side opposite to the position of the central control unit deviates, it becomes difficult to attach the electronic control unit located on the side opposite to the position of the central control unit. However, in the arrangement according to the second aspect, even when the thickness of the first and second electronic control units increases, (1) their extending amounts are small (since these extending amounts are distributed on the two sides) and the degree of freedom in space layout is high; and (2) since the positions of the first and second electronic control units on the third electronic control unit side remain the same, the attachment structure of the electronic control unit can be shared irrespective of the sizes of electronic control units, thus solving the aforementioned problems.

In the vehicle electronic system according to the third aspect, since the control panel and the first and second electronic control units are detachably fixed to the base chassis, they can be attached very easily.

According to the fourth aspect, since the projection which protrudes from a position near the end portion opposite to the interior of the passenger room toward the side where the first electronic control unit is placed is formed on the third electronic control unit, and the projection forms a recess for housing the first electronic control unit adjacent to the third electronic control unit, the building components of the third electronic control unit can be laid out in the projection in which an inner space can be assured, and the thickness of the assembly in the direction in which the electronic control units are juxtaposed can be minimized.

According to the fifth aspect, since the projection protrudes downward, and forms the recess for housing the first electronic control unit under the third electronic control unit, the first electronic unit placed in the recess inevitably suffers inferior heat radiation performance but can be placed under the third electronic control unit. Hence, since heat produced by the third electronic control unit flows upward, it is not readily conducted to the first electronic control unit, thus improving heat radiation performance.

Also, since the building components of the third electronic control unit can be laid out in the projection in which an inner space can be assured, the thickness of the assembly in the direction in which the electronic control units are juxtaposed can be minimized.

According to the sixth aspect, since the third line detachably connects the control panel and third electronic control unit via connectors, the control panel having different designs depending on, e.g., the models of vehicles can be attached to the third electronic control unit, thus improving the degree of freedom in replacement in units of electronic control units.

According to the seventh aspect, the display unit or the insertion hole of the storage medium is formed in the neighborhood of the control panel in place of facing the interior of the passenger room via the opening of the control panel. Hence, even when the passenger room-side surface of the display unit or the insertion hole of the storage medium is formed to be substantially flush with the control panel surface, the control panel can be prevented from interfering with the display unit or the insertion hole of the storage medium upon assembling the first electronic control unit to the third electronic control unit, thus allowing easy assembly.

More specifically, as shown in FIG. 12, an MD unit 20' has a display unit or an MD insertion hole on the surface facing the passenger room. When an opening for exposing the display unit or MD insertion hole to the interior of the passenger room is formed on the control panel, and the passenger room-side surface of the display unit or MD insertion hole is formed to be substantially flush with the control panel surface, the portion around the opening of the control panel interferes with the display unit or MD insertion hole upon assembling that MD unit to a recess 41', and the MD unit cannot be easily assembled thereto. However, the seventh aspect can solve such problem.

According to the eighth aspect, since the recess has the connector for connecting the third electronic control unit to the vehicle body side, the connector can be laid out in the projection in which an inner space can be assured, and the thickness of the assembly in the direction in which the electronic control units are juxtaposed can be minimized.

According to the ninth embodiment, since the connector for electrically connecting the second electronic control unit is located on the upper surface of the projection of the third electronic control unit, the attachment strength of the connector can be improved, and breakage or the like can be prevented.

According to the 10th aspect, since the storage medium to be inserted into the first electronic control unit is smaller than that to be inserted into the second electronic control unit, i.e., the storage medium to be inserted into the lower unit is smaller, the fear of interference between the storage medium and the shift lever of a vehicle transmission system can be minimized. Since a smaller storage medium is laid out on the side where the projection of the third electronic control unit is formed, the size of the vehicle electronic system in the direction of the interior of the passenger room can be reduced.

According to the 11th aspect, since the connector of the first line is the first connector which is mounted on one surface of the circuit board built in the third electronic control unit and is to be electrically connected to the first electronic control unit, and the connector of the second line is the second connector which is mounted on the other surface of the circuit board and is to be electrically connected to the second electronic control unit, the thickness of the third electronic control unit can be reduced. Also, since these connectors are directly mounted on the circuit board, a cost reduction can be achieved.

According to the 12th aspect, since the base chassis has openings or an opening at its upper end and/or the lower end, and each of the first and second electronic control units is attached from the above or below the base chassis, another electronic control unit can be additionally mounted. Even when the size (especially, thickness) of the first or second electronic control unit increases, it can be prevented from stretching outside the base chassis. Note that no large inner space need be assured in the base chassis, and downsizing of the vehicle electronic system can be achieved.

According to the 13th aspect, since the first electronic control unit and control panel respectively have the second insertion hole and second communication hole, and the third electronic control unit is placed parallel to the first and second electronic control units so as not to disturb the path between the second insertion hole and second communication hole, easier function expandability or exchangeability, a cost reduction, and space savings can be achieved.

According to the 14th aspect, since the base chassis has the reference attachment portion which serves as the reference position upon attaching the first and second electronic control units, and an error allowing attachment portion for attaching the first and second electronic control units while allowing certain position errors, and the connector of at least one of the first and second electronic control unit is placed at a position closer to the reference attachment portion than the error allowing attachment portion, the connectors can be reliably positioned, and breakage or the like upon connection can be prevented.

According to the 15th aspect, the heat radiation hole is formed on the housing of the first electronic control unit placed below the third electronic control unit, except for a portion corresponding to the control arithmetic unit built in the first electronic control unit. Thus, although heat produced by the control arithmetic unit of the first electronic control unit is normally apt to rise upward, any adverse influences on the most important third electronic control unit which is the center of the vehicle electronic system (if the third electronic control unit fails due to heat, switch operations may cease to be accepted at all) and is located above the first electronic control unit can be minimized.

According to the 16th aspect, since the heat radiation hole is formed on the side surface of the housing of the first electronic control unit, and the heat radiation hole is formed on the side surface of the third electronic control unit at a position corresponding to the heat radiation hole of the first electronic control unit, heat radiation performance of the electronic control unit placed under the third electronic control unit can be improved.

According to the 17th aspect, since the first and second electronic control units respectively comprise the drive means for driving their storage media to load predetermined data therefrom, and the third electronic control unit does not have any drive means for driving a storage medium to load predetermined data therefrom, and the first and second electronic control units with the drive means are placed on the two sides of the third electronic control unit without any drive means, heat produced by the drive means can be easily radiated from the vehicle electronic system, thus improving heat radiation performance. At this time, although the third electronic control unit is sandwiched between the first and second electronic control units, no heat is produced by the third electronic control unit since it does not have any drive means, and heat radiation performance of the vehicle electronic system as a whole can be optimized at high level.

According to the 18th aspect, the third electronic control unit incorporates at least the radio tuner. Therefore, even when radio tuners are prepared to have different specifications in units of destination countries, i.e., frequencies, since the frequencies of radios vary depending on destination countries, control units which must also be prepared to have different specifications due to influences on control functions of a plurality of units including a radio tuner can be prepared together, thus improving productivity. Furthermore, since the radio tuner which can be prepared by only exchanging parts is provided to the first electronic control unit, space savings and standardization of units can be easily achieved, and a storage space for the respective units can be assured without redesigning the first electronic control unit even when different types of second and third control units are used.

According to the 19th aspect, since the central processing unit for outputting control signals and display control signals, and the radio tuner are mounted on the circuit board of the third electronic control unit, the circuit board of the third electronic control unit need only be exchanged for countries using different frequencies, thus allowing easy setups in units of destination countries.

According to the 20th aspect, the third electronic control unit is placed below the first and second electronic control units. Thus, although heat produced by the first and second electronic control units is normally apt to rise upward, any adverse influences on the most important third electronic control unit which is the center of the vehicle electronic system (if the third electronic control unit fails due to heat, switch operations may cease to be accepted at all) and is located below the first and second electronic control units (i.e., a position where that heat does not reach) can be minimized.

Other objects and advantages besides those discussed above shall be apparent to those skilled in the art from the description of a preferred embodiment of the invention which follows. In the description, reference is made to accompanying drawings, which form a part thereof, and which illustrate-an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 15 is a schematic side view for explaining still another application example of the control panel and first to third electronic control units;

FIG. 19 is a perspective view showing the housing arrangement and attachment structure of the first to third electronic control units;

DETAILED DESCRIPTION OF THE PREFERRED EMBODIMENTS

The preferred embodiments according to the present invention will be described in detail hereinafter with reference to the accompanying drawings.

First Embodiment

Figure 1:
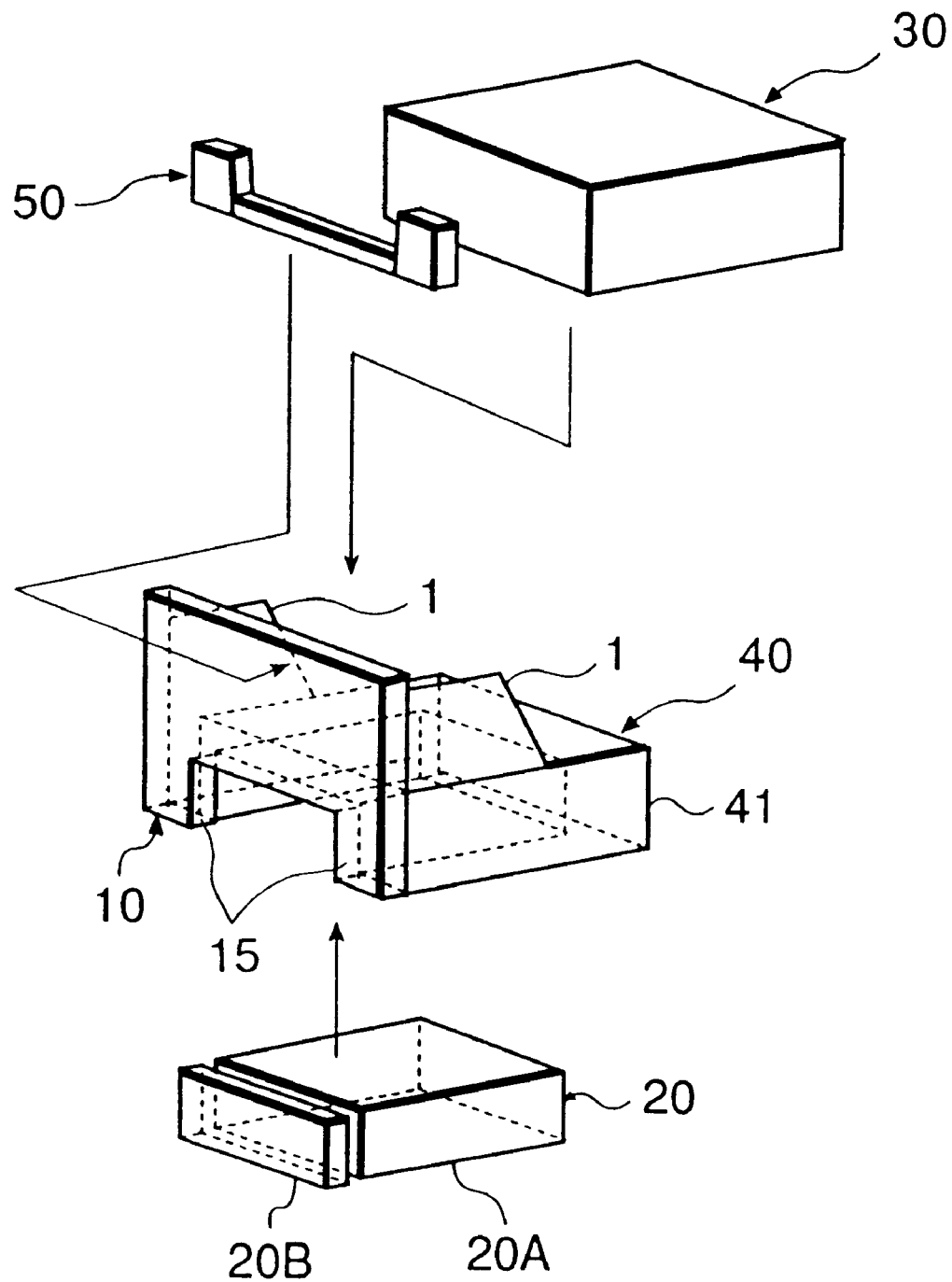
FIG. 1 is an exploded perspective view of a vehicle electronic system according to the first embodiment of the present invention.
Figure 2:
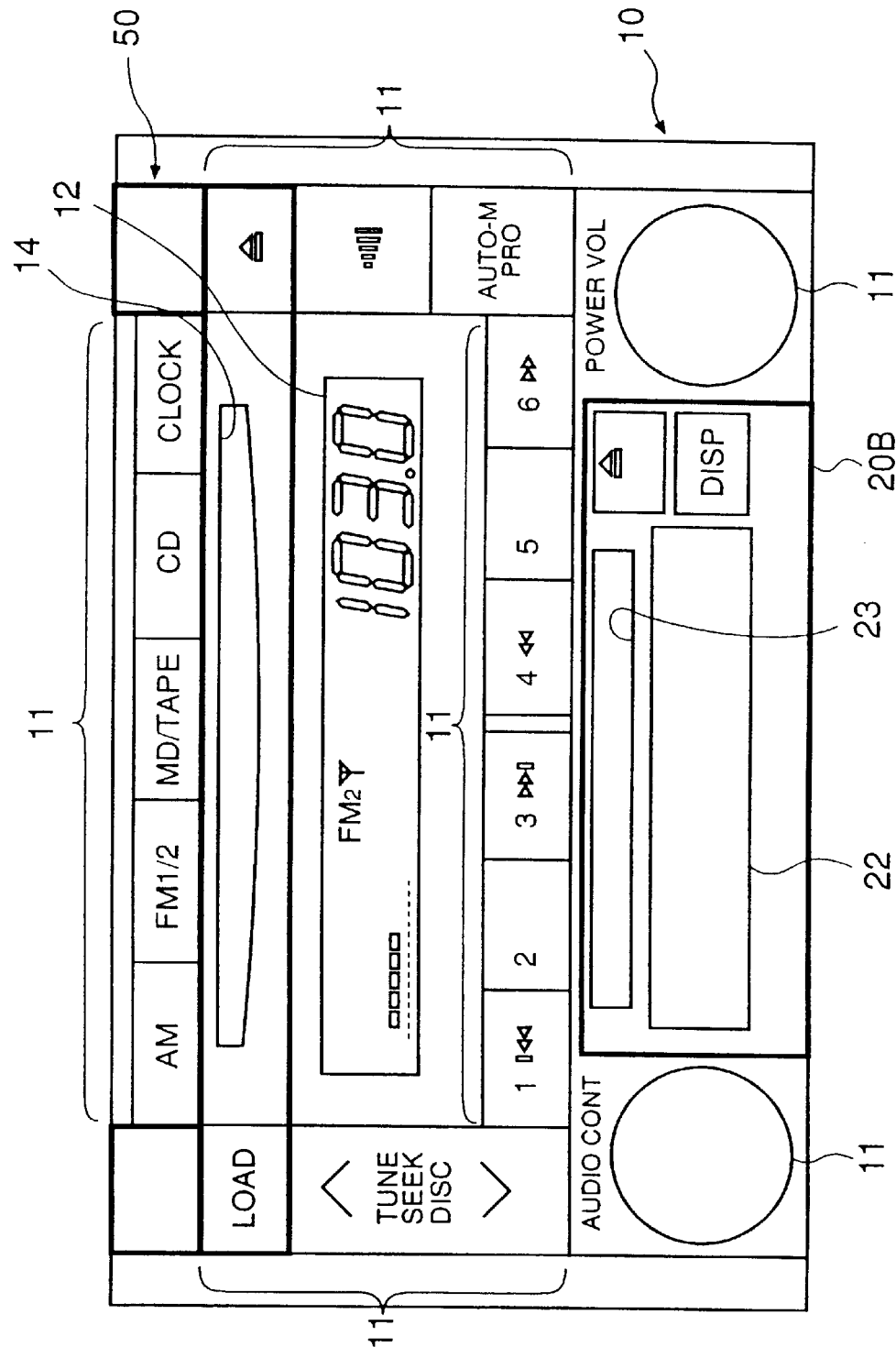
FIG. 2 is a front view of a control panel.

FIG. 1 is an exploded perspective view of a vehicle electronic system of the first embodiment. FIG. 2 is a front view of a control panel.

As shown in FIGS. 1 and 2, the vehicle electronic system of the first embodiment comprises a first electronic control unit 20 for reading out and playing back information recorded on a sound storage medium such as a cassette tape, mini disk (MD), or the like, a second electronic control unit 30 for reading out and playing back information stored in a sound storage medium such as a compact disk (CD) or the like, a third electronic control unit 40 which systematically controls these first and second electronic control units 20 and 30, and has a radio tuner function, and a control panel 10 which allows the passenger to concentratively operate the first to third electronic control units 20 to 40. The control panel 10 faces the interior of a passenger room of a vehicle, and the first to third electronic control units 20 to 40 are placed on the back side of the control panel 10.

More specifically, the first electronic control unit 20 is a cassette player, MD player, or the like which reads out and plays back information stored in a storage medium of a given size, and the second electronic control unit 30 is a CD player, a CD player with a CD changer function that can store a plurality of CDs, or the like, which reads out and plays back information stored in a storage medium having a size larger than that of the first electronic control unit 20.

Note that the first and second electronic control units 20 and 30 may also have a function of writing information in a storage medium.

Control switches 11 for operating the respective electronic control units such as a radio, CD, cassette tape, MD, and the like, a panel display device 12 such as an LCD for displaying the operation modes of the respective electronic control units, and a panel communication hole 14 via which a storage medium is inserted into or ejected from the second electronic control unit 30, are provided on that surface of the control panel 10, which faces the interior of the passenger room. The panel display device 12 displays display data of the respective electronic control units using segments and characters, except for character data of the MD.

A base chassis 1 is detachably fixed to the vehicle body, and is detachably attached to the control panel 10. The first to third electronic control units 20 to 40 are detachably fixed on the base chassis 1, and are placed on the other surface of the control panel 10.

Figure 3:
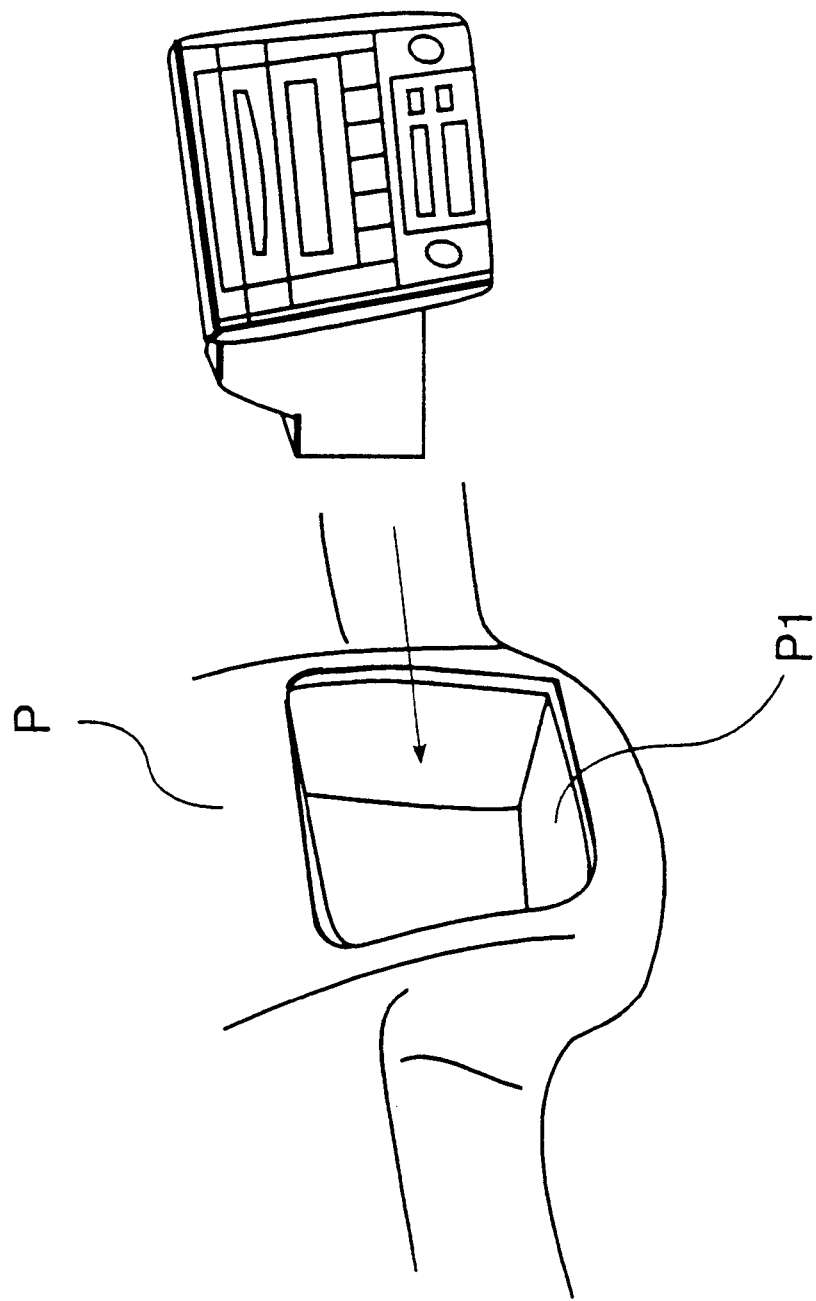
FIG. 3 is a perspective view showing the attachment structure of the vehicle electronic system of the first embodiment in a passenger room.

The base chassis 1 is detachably attached to an attachment cavity P1 of an instrument panel P shown in FIG. 3.

The third electronic control unit 40 is detachably fixed to the base chassis 1. The third electronic control unit 40 receives switch signals from the control switches, and selectively outputs control signals corresponding to these switch signals to the first and second electronic control units 20 and 30. The third electronic control unit 40 is electrically connected to the control panel 10 and the first and second electronic control units 20 and 30 via connectors to be able to communicate with them, and is interposed between the first and second electronic control units 20 and 30 on the other surface side of the control panel 10.

The first electronic control unit 20 is constructed by a housing 20A, and a passenger room-side surface portion 20B which projects from the housing 20A toward the interior of the passenger room.

A pair of projections 15 are integrally formed on the control panel 10. These projections 15 form a recess which surrounds the edge portion of the passenger room-side surface portion 20B and a text display device 22 of the first electronic control unit 20 viewed from the passenger room side, and expose them to the interior of the passenger room. A volume switch for adjusting the tone volume of the sound functions as one of the control switches 11 is arranged on at least one of the pair of projections 15.

With this structure, the control switch can be mounted on dead spaces present on the two sides of the passenger room-side surface portion 20B of the first electronic control unit 20 to achieve space savings, and the portion 20B forms an integral structure with the control panel, thus providing a good outer appearance.

FIG. 3 shows the attachment structure of the vehicle electronic system of the first embodiment in the passenger room.

As shown in FIG. 3, the control panel 10 and the first to third electronic control units 20 to 40 fixed by the base chassis 1 are attached to the attachment cavity P1 between the driver seat and front passenger seat in the instrument panel P on the front side in the passenger room, on which meters such as a speedometer and the like are set. The control switches 11 and panel display device 12 can be operated by the passenger. The control switches 11 can systematically operate the respective sound modules in place of those provided in units of sound modules.

Figure 4:
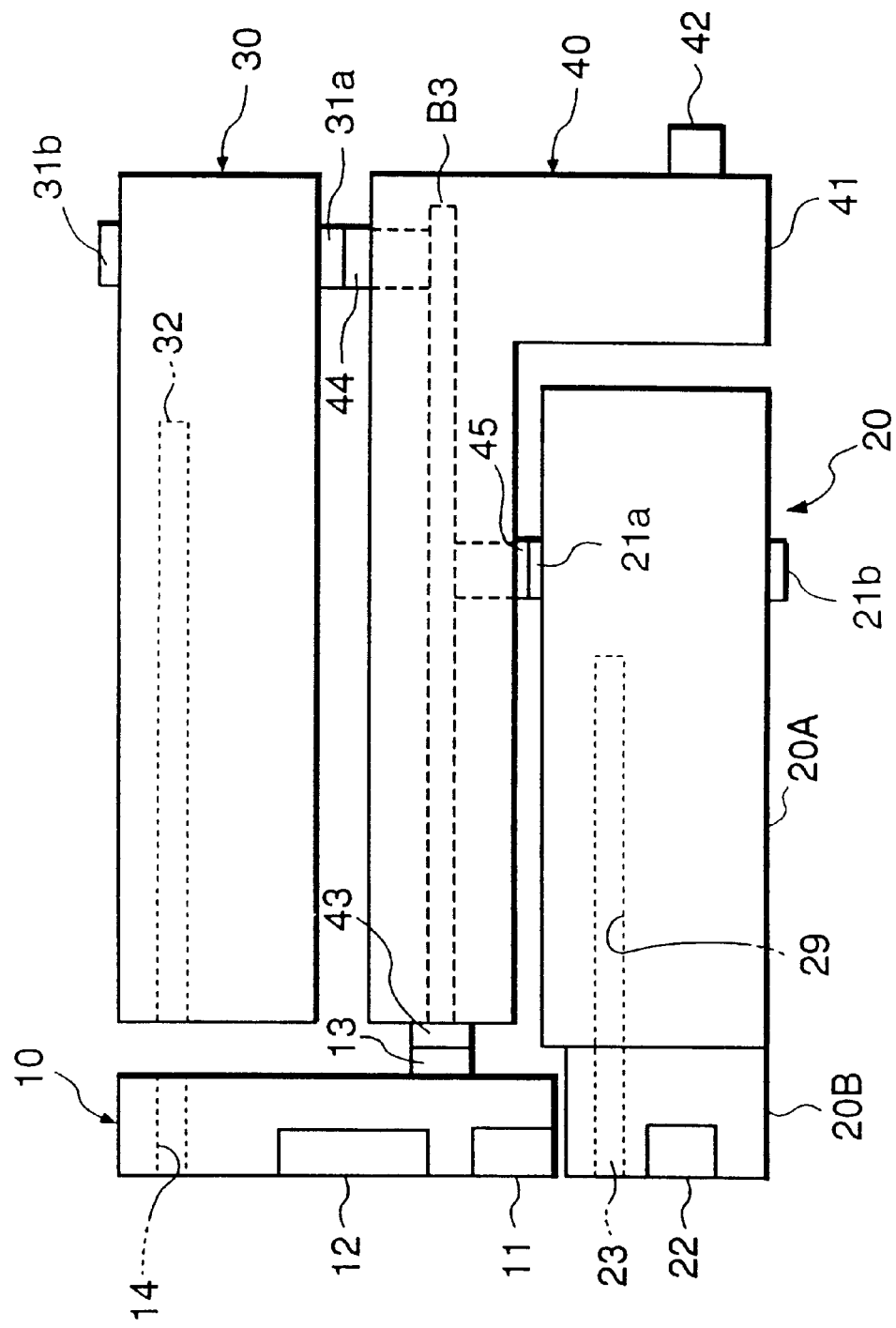
FIG. 4 is a schematic side view of the vehicle electronic system of the first embodiment.

FIG. 4 is a schematic side view of the vehicle electronic control unit of the first embodiment.

As shown in FIGS. 1 and 4, a projection 41 is formed on the lower end side edge portion of the third electronic control unit 40 to protrude downward, and forms a recess which has a lower opening to house the first electronic control unit 20 underneath the third electronic control unit 40. With this structure, the first electronic control unit 20 placed in the recess inevitably suffers somewhat inferior heat radiation performance. However, since the first electronic control unit 20 is placed beneath the third electronic control unit 40, heat produced by the third electronic control unit 40 flows upward and is hardly conducted to the first electronic control unit 20, thus improving heat radiation performance.

The building components of the third electronic control unit 40 can be laid out in the projection 41 in which an inner space can be assured, and the vertical thickness of the assembly in which the first to third electronic control units are placed parallel to each other can be minimized.

The third electronic control unit 40 and control panel 10 are constructed integrally or separately. When the third electronic control unit 40 and control panel 10 are separately constructed, they are detachably electrically connected via connectors 13 and 43, and are physically and mechanically detachably coupled.

When the third electronic control unit 40 and control panel 10 are prepared separately and are detachably coupled via the connectors 13 and 43, a control panel 10 having a different design may be attached to the third electronic control panel 40 depending on, e.g., the model of the vehicle, thus improving the degree of freedom in replacement in units of electronic control units.

The passenger room-side surface portion 20B of the first electronic control unit 20 integrally has the text display device 22, which is formed to be substantially flush with the control panel surface while the first electronic control unit 20 is housed under the third electronic control unit 40, and displays display data read out from the storage medium loaded into the first electronic control unit 20. Also, a passenger room-side surface portion insertion hole 23 via which the storage medium is inserted/ejected is formed on the passenger room-side surface portion 20B.

With this structure, since the first electronic control unit 20 set as an option is integrally formed with the text display device 22, which is supplied at the same time, a cost reduction can be achieved, and parts management is facilitated. Also, a control panel 10 having a different design may be attached to the third electronic control panel 40 depending on, e.g., the model of the vehicle, thus improving the degree of freedom in replacement in units of electronic control units.

The text display device 22 and the passenger room-side surface portion insertion hole 23 are provided in the neighborhood of the control panel 10 in place of facing the interior of the passenger room via the control panel 10. Hence, even when the passenger room-side surfaces of the text display device 22 and passenger room-side surface portion insertion hole 23 are formed to be substantially flush with the control panel surface, the control panel 10 can be prevented from interfering with the text display device 22 or passenger room-side surface portion insertion hole 23 upon assembling the first electronic control unit 20 to the third electronic control unit 40, thus assuring easy assembly.

A connector 42 for electrically connecting the third electronic control unit 40 to vehicle body wiring (not shown) is provided to the projection 41 at its lower portion, i.e., at the lower portion of the third electronic control unit 40. In general, since the wiring from the vehicle body extends from a lower position, its length can be reduced, thus achieving cost and weight reductions. Also, the connector 42 can be laid out in the projection 41 in which an inner space can be assured, and the vertical thickness of the assembly in which the first to third electronic control units are placed parallel to each other can be minimized.

A connector 44 to be electrically connected to a connector 31a of the second electronic control unit 30 is provided to the upper surface of the projection 41 of the third electronic control unit 40, and a connector 45 to be electrically connected to a connector 21a of the first electronic control unit 20 is provided to the lower surface of the third electronic control unit 40.

Since the connector 44 to be electrically connected to the second electronic control unit 30 is provided to the upper surface of the projection 41 of the third electronic control unit 40, its attachment strength can be increased, thus preventing breakage or the like.

Also, the connector 44 can be laid out in the projection 41 in which an inner space can be assured, and the vertical thickness of the assembly in which the first to third electronic control units are placed parallel to each other can be minimized.

Furthermore, since the storage medium inserted into the first electronic control unit 20 is smaller than that inserted into the second electronic control unit 30, the storage medium to be inserted into the unit under the third electronic control unit 40 is smaller. Hence, the fear of interference between the storage medium and the shift lever of a vehicle transmission system can be minimized. Since a smaller storage medium is laid out on the side where the projection 41 of the third electronic control unit 40 is formed, the size of the vehicle electronic system in the direction in the interior of the passenger room can be reduced.

The connectors 44 and 45 are directly mounted on the upper and lower surfaces of a circuit board B3 built in the third electronic control unit 40, respectively.

With this arrangement, the thickness of the third electronic control unit 40 can be reduced. Also, since these connectors are directly mounted on the circuit board, a cost reduction can be achieved.

Since the third electronic control unit 40 is electrically connected to the control panel 10 and the first and second electronic control units 20 and 30 via the connectors to be able to exchange control signals and display data therewith, and is placed between the first and second electronic control units 20 and 30 on the surface of the control panel 10 opposite to the passenger room, the first and second electronic control units 20 and 30 can be laid out vertically to sandwich the third electronic control unit 40 therebetween, thus improving the degree of freedom in layout.

Also, high heat radiation performance, especially, easy assembly in terms of electrical connections between the first and second electronic control units 20 and 30, and downsizing of the vehicle electronic system can be achieved. Moreover, even when the size of the first or second electronic control unit 20 or 30 increases, it can be assembled without any problem.

Note that the connector 21a which engages with the connector 45 of the third electronic control unit 40 is provided on the upper surface of the first electronic control unit 20, and a connector 21b for electrically connecting another fourth electronic control unit is provided on the lower surface of the first electronic control nit 20, thus allowing easy expansion of functions. Similarly, the connector 31a, which engages with the connector 44 of the third electronic control unit 40, is provided on the lower surface of the second electronic control unit 30, and a connector 31b for electrically connecting another fourth electronic control unit is provided on the lower surface of the second electronic control unit 30, thus allowing easy expansion of functions.

The connectors 21a and 21b (or the connectors 31a and 31b) are provided to substantially the same portions on the opposing surfaces. With this structure, even when the first or second electronic control unit 20 or 30 is not attached, the fourth electronic control unit and the third electronic control unit 40 can be electrically coupled to each other via the connectors, and the degree of freedom in connections at that time can be improved.

Furthermore, in this embodiment, the panel display device 12 alone is provided to the control panel 10, and is separated from the text display device 22 of the first electronic control unit 20. However, both the panel display device 12 and text display device 22 may be provided to the control panel, and a desired arrangement may be selected in correspondence with the cost and types of electronic control units.

The first electronic control unit 20 has a first insertion hole 29 via which a storage medium such as an MD or the like is inserted/ejected, and the second electronic control unit 30 has a second insertion hole 32 via which a storage medium such as a CD or the like is inserted/ejected. The control panel 10 has the panel communication hole 14 through which a storage medium corresponding to the second insertion hole 32 is inserted. Note that the first and second insertion holes 29 and 32 are formed when the first and second electronic control units 20 and 30 have a function of reading out information from storage media.

In this manner, the storage media can be easily inserted/ejected. Also, even when the size (especially, the thickness) of the first or second electronic control unit 20 or 30 increases, it can be prevented from stretching outside the base chassis 1 as long as the position of the panel communication hole 14 is adjusted in advance. Note that a large inner space of the base chassis need not be assured in advance, and downsizing of the vehicle electronic system can be achieved.

Furthermore, since the first insertion hole 29 for inserting/ejecting the storage medium is formed on the passenger room-side surface of the first electronic control unit 20, the control panel 10 need not be changed irrespective of storage media used by the first electronic control unit 20, thus allowing use of a common control panel 10.

The height of the passenger room-side surface portion 20B of the first electronic control unit 20 is set to be smaller than the thickness of the housing 20A thereof.

With this structure, since the thickness of the text display device 22 in the passenger room-side surface portion 20B is smaller than the first electronic control unit 20, the area of the control panel itself can be increased, thus improving its design.

Figure 5:
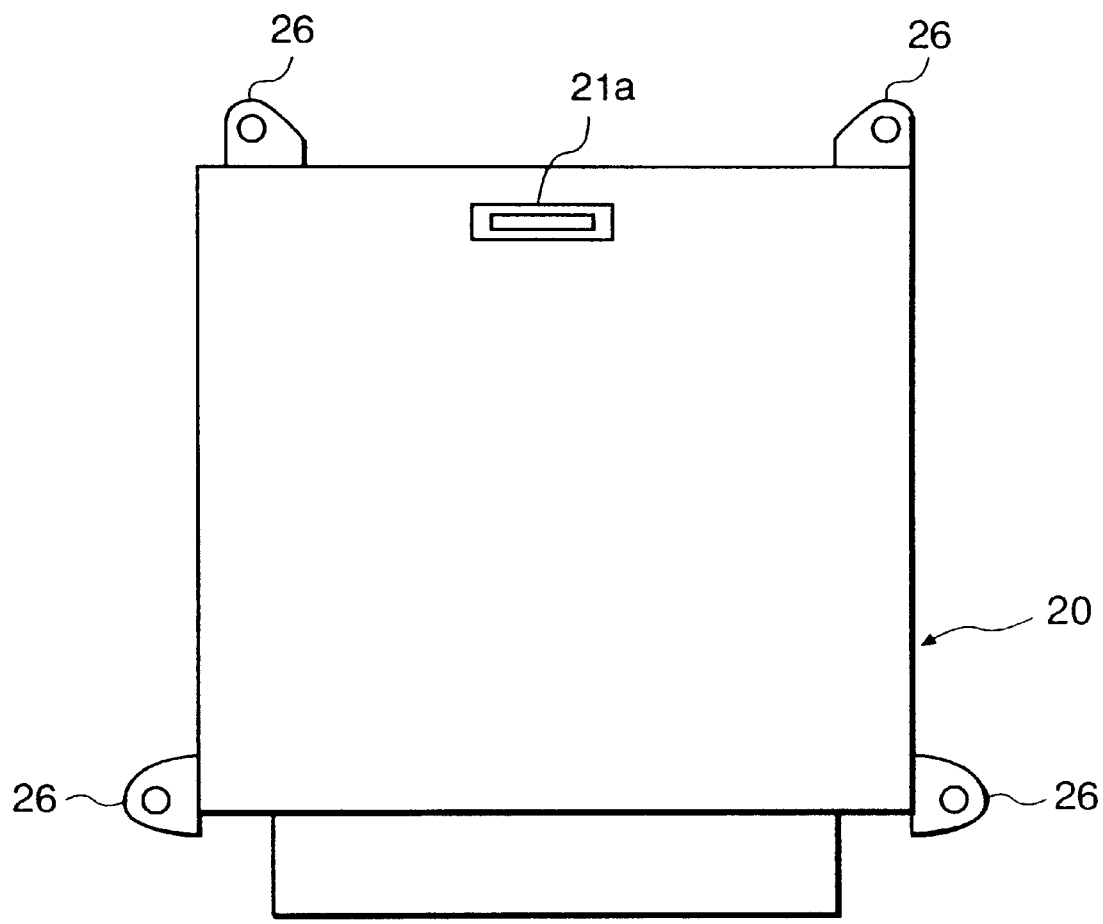
FIG. 5 is an upper plan view of a first electronic control unit.
Figure 6:
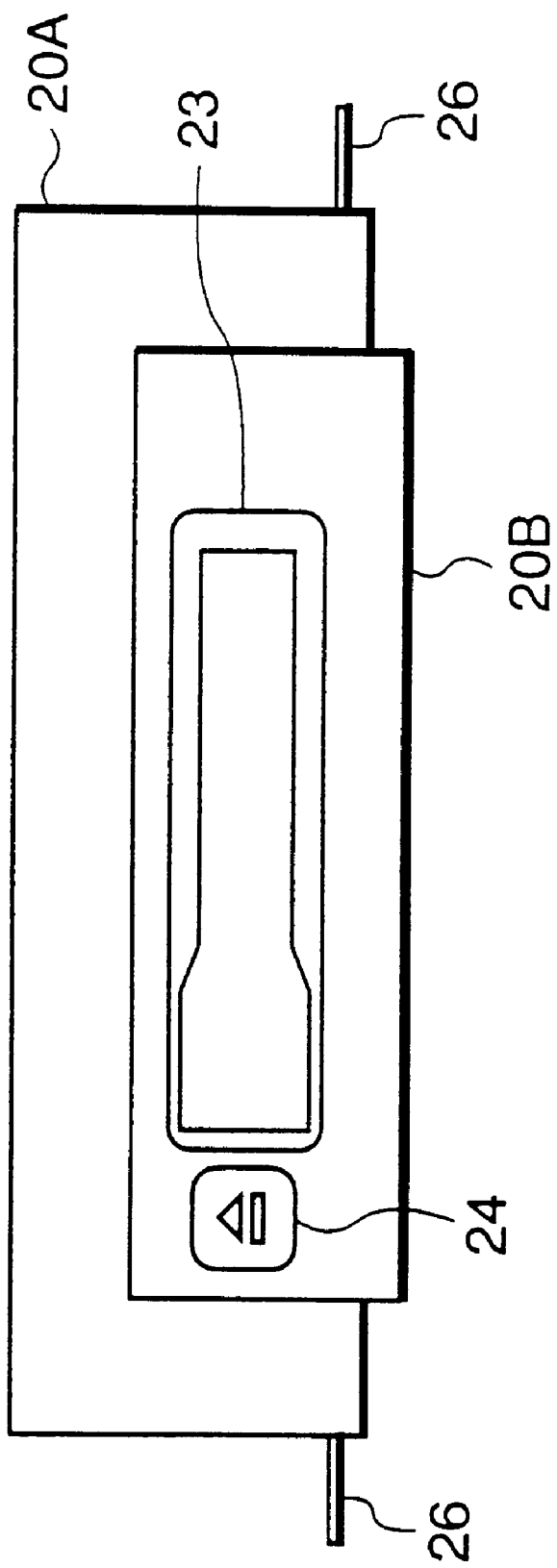
FIG. 6 is a front view of the first electronic control unit viewed from the passenger room side when it is a cassette tape player.
Figure 7:
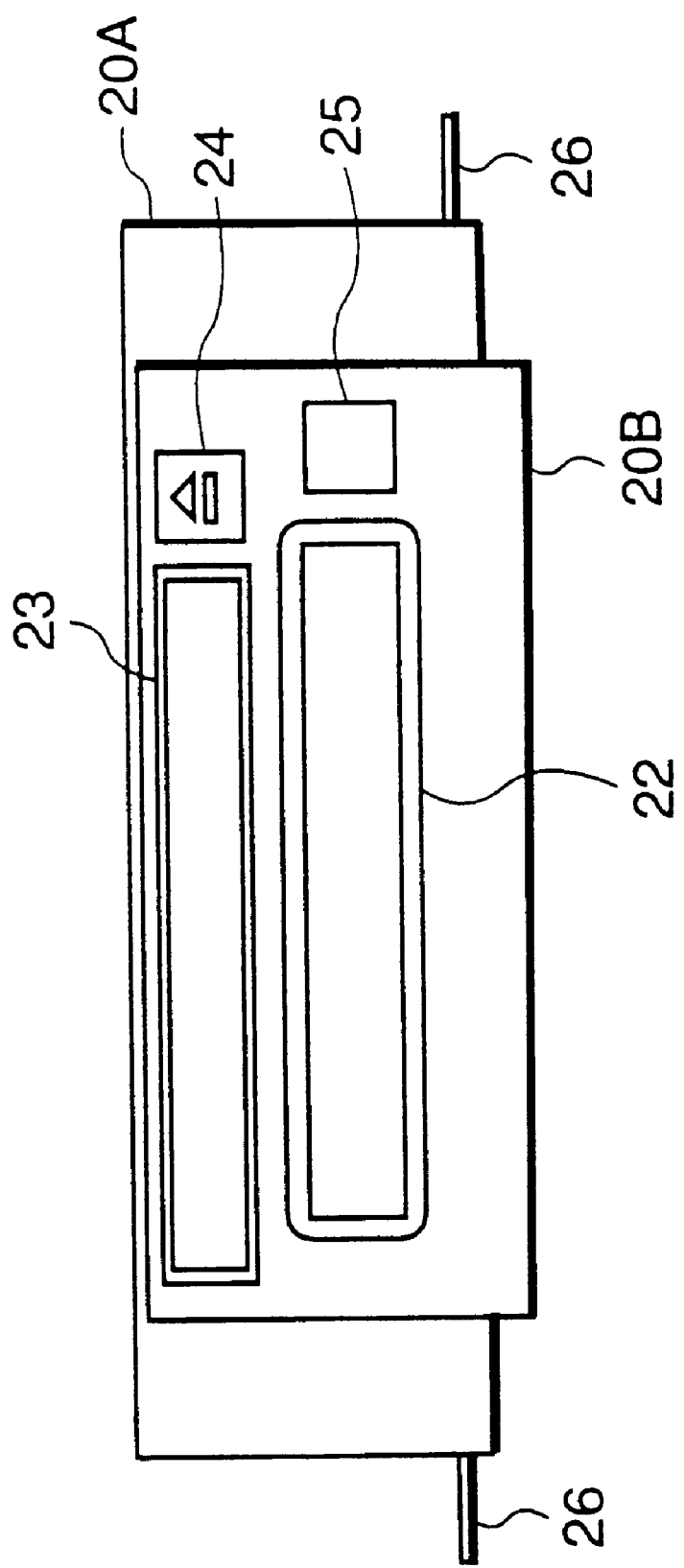
FIG. 7 is a front view of the first electronic control unit viewed from the passenger room side when it is an MD player.

FIG. 5 is an upper plan view of the first electronic control unit. FIG. 6 is a front view of the first electronic control unit viewed from the passenger room side when it is a cassette player. FIG. 7 is a front view of the first electronic control unit viewed from the passenger room side when it is an MD player.

As shown in FIG. 5, the connector 21a is provided on the upper surface of the housing 20A of the first electronic control unit 20, and attachment portions 26, which are stored in recesses in the third electronic control unit 40 and are fixed to the base chassis 1 are also formed on the upper surface.

On the other hand, when the first electronic control unit 20 is a cassette player, as shown in FIG. 6, the passenger room-side surface portion insertion hole 23 via which a cassette tape is inserted/ejected, and an eject switch 24 for instructing ejection of the storage medium are provided on the passenger room-side surface portion 20B. Also, when the first electronic control unit 20 is an MD player, as shown in FIG. 7, the text display device 22 such as an LCD or the like for displaying an album title, song title, and the like of audio data recorded on an MD, the passenger room-side surface portion insertion hole 23 via which an MD is inserted/ejected, the eject switch 24, and a display switch 25 for operating the text display device 22 are provided. The text display device 22 displays display data that pertains to an inserted MD by dots. At the same time, the track number is displayed on the common, segment display type panel display device 12 on the control panel.

In this manner, since the eject switch 24 for instructing ejection of the storage medium is placed on the passenger room-side surface of the first electronic control unit 20, the eject switch 24 and the first electronic control unit 20 whose operation is controlled by that eject switch 24 can be easily associated with each other. In addition, even when the first electronic control unit 20 does not use any storage medium, the control panel 10 need not be changed, thus allowing use of a common control panel 10.

The panel display device 12 is provided to the passenger room-side surface of the control panel 10, and the text display device 22 is provided to the passenger room-side surface of the first electronic control unit 20 to face the passenger room so as to be substantially flush with the control panel surface. Also, the panel display device 12 displays some display data pertaining to the second electronic control unit 30 and display data pertaining to the first electronic control unit 20, and the text display device 22 displays other display data pertaining to the first electronic control unit 20. In this manner, when display data pertaining to a given electronic control unit is to be displayed on the display unit, the display area or time of display data pertaining to another electronic control unit can be prevented from being excessively limited.

When the first electronic control unit 20 is an MD or CD unit, since data read out from an MD or CD consists of many unspecified characters, a relatively large space is required for displaying that character string. Even in such case, the display area or time can be prevented from being excessively limited.

When character data that pertains to the second electronic control unit 30 is displayed on the text display device via the first electronic control unit 20, that character data can be appropriately displayed without increasing cost even when character data that pertains to the second electronic control unit 30 must be displayed.

Note that the first electronic control unit 20 can be laid out on either the upper or lower portion of the control panel 10. For example, when a select lever of an automatic transmission system is provided to a steering column, an ejected storage medium stays out of the way of the select lever independently of the layout position of the first electronic control unit 20. However, when the select lever is provided on the front floor portion at the center of the vehicle width, the storage medium can be ejected more easily when the second electronic control unit 30 that uses a larger storage medium (e.g., a CD) than the first electronic control unit 20 is laid out at the upper position and the first electronic control unit 20 is laid out at the lower position.

When the passenger room-side surface of the first electronic control unit 20 is laid out in the neighborhood of the lower portion of the control panel 10, a gap is formed between the control panel 10 and the text display device. However, since the gap is present below the control panel, it does not stand out, thus making the outer appearance good.

On the control panel 10, a volume switch and power switch as the control switches 11 are provided around the passenger room-side surface portion 20B of the first electronic control unit 20.

Note that the first electronic control unit 20 and text display device 22 may be constructed either integrally or separately.

Figure 8:
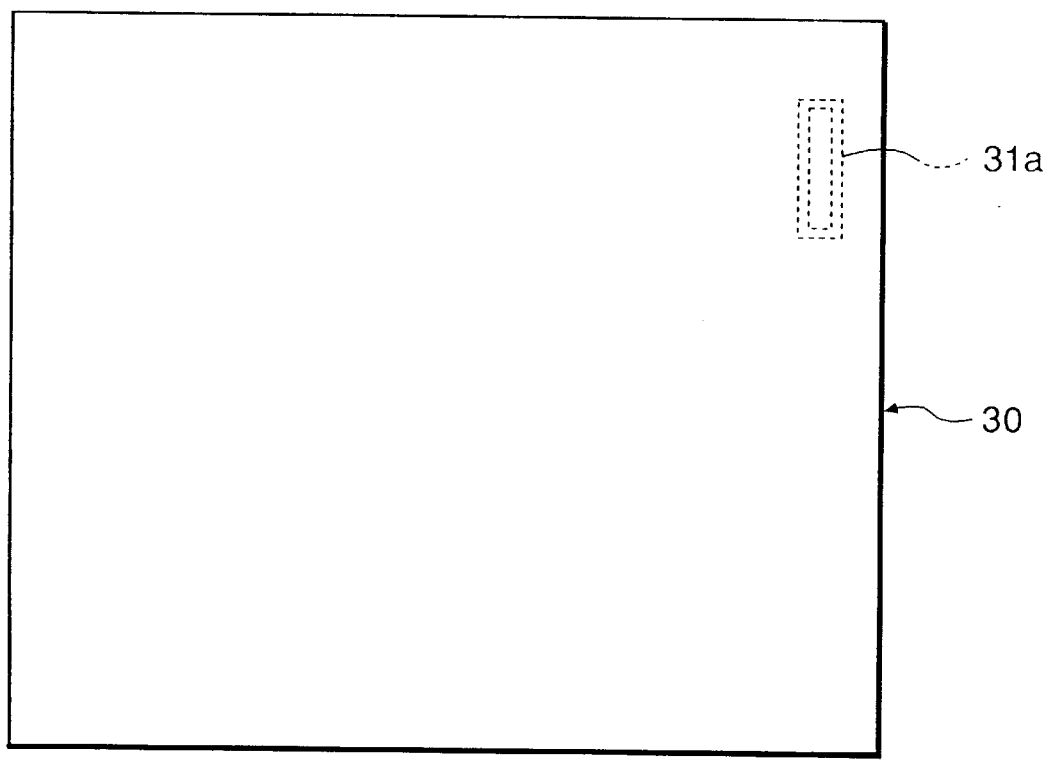
FIG. 8 is an upper plan view of a second electronic control unit.
Figure 9:
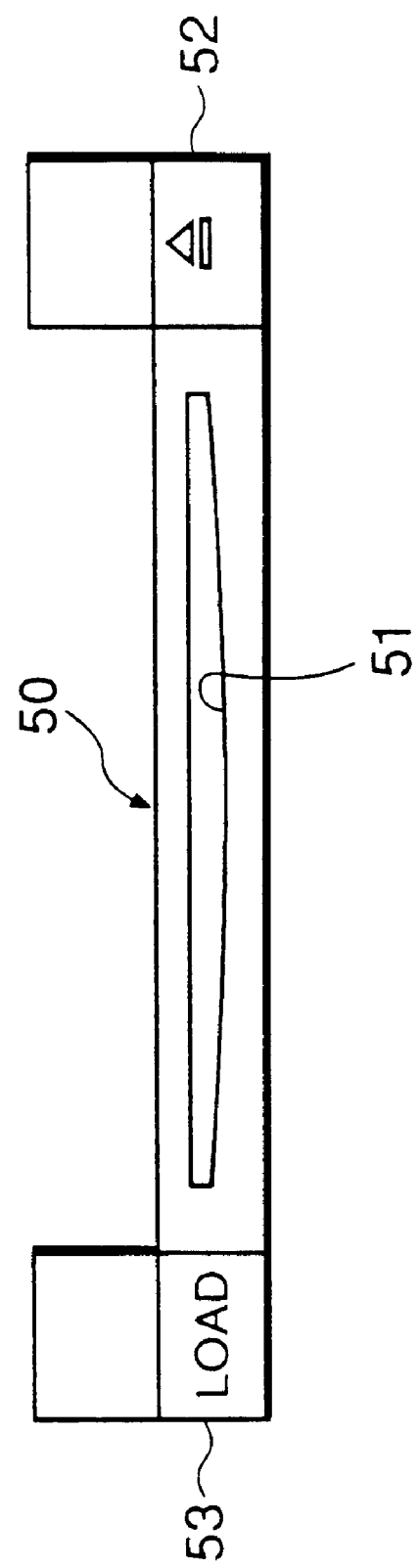
FIG. 9 is a front view, viewed from the passenger room side, of a dedicated panel to be attached to the control panel when the second electronic control unit is a CD player with a CD changer function.

FIG. 8 is an upper plan view of the second electronic control unit. FIG. 9 is a front view, viewed from the passenger room side, of a switch panel attached to the control panel when the second electronic control unit is a CD player with a CD changer function.

As shown in FIG. 8, the connector 31a is formed on the lower surface of the second electronic control unit 30 in correspondence with the upper surface of the projection of the third electronic control unit 40, and is placed on the upper surface of the third electronic control unit 40.

As shown in FIGS. 2 and 9, when the second electronic control unit 30 is a CD player with a CD changer function, a switch panel 50 is mounted on the control panel 10 at a position corresponding to the second control unit 30. The switch panel 50 has a communication hole 51 with a cover, via which a CD is inserted/ejected, an eject switch 52, and a load switch 53 used upon storing a plurality of CDs. When the second electronic control unit 30 does not have any CD changer function, a switch panel from which the switch function of the load switch is omitted is mounted. When no second electronic control unit 30 is mounted, a flat switch panel from which all of the communication hole 51, eject switch 52, and load switch 53 are omitted, is mounted.

In this manner, good outer appearance is assured.

Electrical Arrangement

Figure 10:
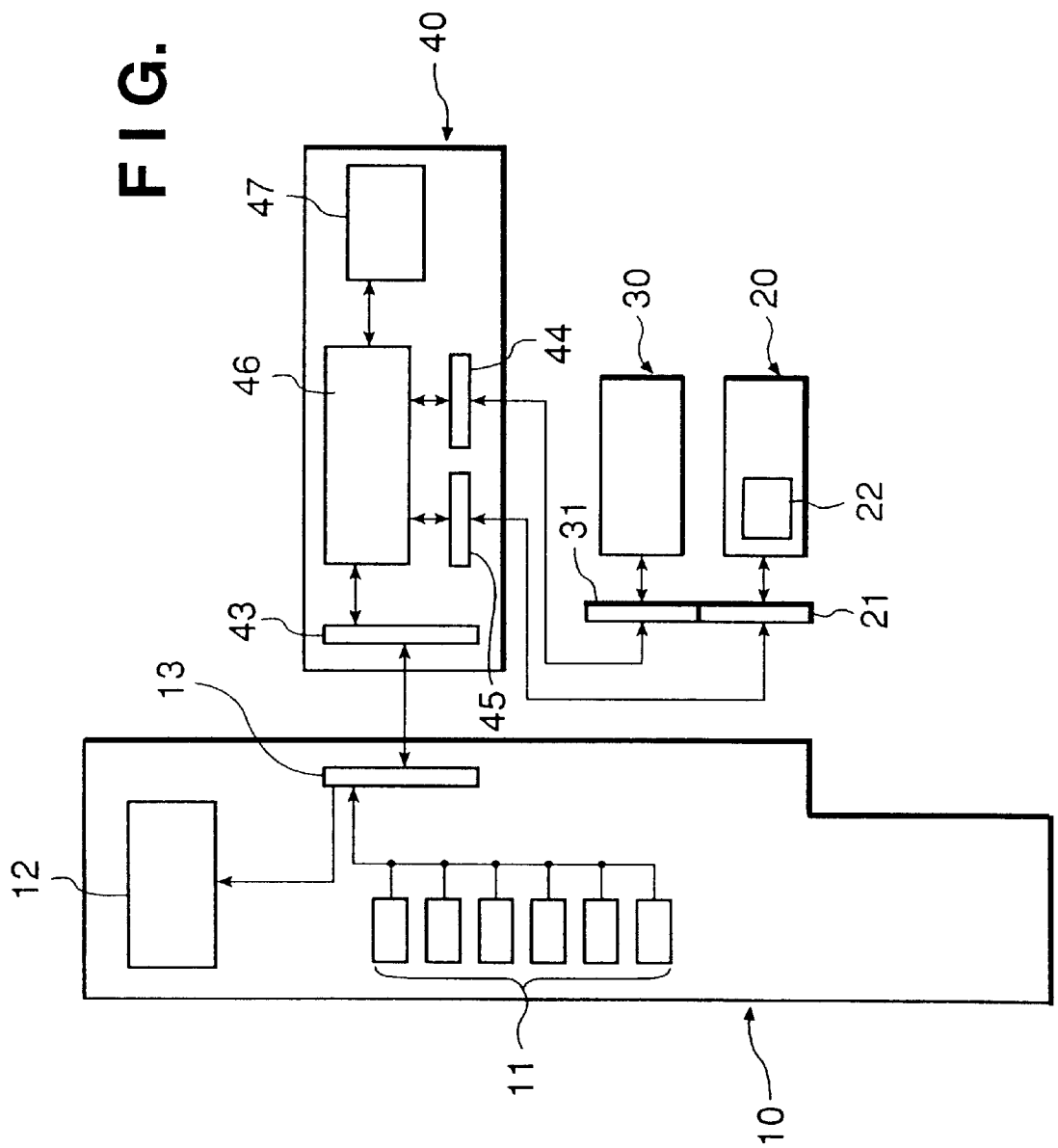
FIG. 10 is a block diagram showing the electrical arrangement of the vehicle electronic system shown in FIG. 4.

FIG. 10 is a block diagram showing the electrical arrangement of the vehicle electronic control units shown in FIG. 4.

As shown in FIG. 10, the control panel 10 and the third electronic control unit 40 are electrically connected to each other via the connector 13 of the control panel 10, and the connector 43 of the third electronic control unit 40, and switch signals from the control switches 11 are input to a CPU 46 of the third electronic control unit 40. The CPU 46 controls display of the panel display device 12 of the control panel 10, and also controls the first and second electronic control units 20 and 30.

The third and second electronic control units 40 and 30 are electrically connected to each other via the connector 44 of the third electronic control unit 40 and the connector 31a of the second electronic control unit 30. The CPU 46 of the third electronic control unit 40 outputs a control signal to the second electronic control unit 30 in accordance with the switch signals from the control switches 11, and also controls display of the panel display device 12 of the control panel 10 in accordance with the operation mode of the second electronic control unit 30.

The third and first electronic control units 40 and 20 are electrically connected to each other via the connector 45 of the third electronic control unit 40, and the connector 21a of the first electronic control unit 20. The CPU 46 of the third electronic control unit 40 outputs a control signal to the first electronic control unit 20 in accordance with the switch signals from the control switches 11, and also controls display of the panel display device 12 of the control panel 10 in accordance with the operation mode of the first electronic control unit 20.

Furthermore, the CPU 46 of the third electronic control unit 40 controls a radio tuner 47 in accordance with switch signals from the control switches 11.

The first electronic control unit 20 is directly or indirectly, electrically and physically detachable from the control panel 10, and even when the first electronic control unit 20 is detached, the vehicle electronic system of this embodiment can achieve the control function of at least the second electronic control unit 30.

In this manner, even when the first electronic control unit 20 is attached as an option, the display area or time of display data that pertains to another electronic control unit can be prevented from being excessively limited.

When a storage medium of the second electronic control unit 30 contains character data, that character data is displayed on the text display device 22 via the first electronic control unit 20. In this fashion, even when the storage medium of the second electronic control unit 30 contains character data, an appropriate display can be made.

For example, since a CD stores display data of an album title, song titles, and the like as well, if the second electronic control unit 30 is a CD unit, the CD unit reads out the display data of the album title, song titles, and the like from the CD and outputs those display data to the first electronic control unit 20, which can display the display data from the CD unit using the text display device 22.

If the first electronic control unit 20 is an MD unit, the MD unit reads out display data of the album title, song titles, and the like, and displays them using the text display device 22.

The third electronic control unit 40 is connected to the first and second electronic control units 20 and 30 via multiplex communication lines to be able to communicate with each other, and the first and second electronic control units 20 and 30 are assigned unique ID codes. When the third electronic control unit 40 is connected to the first and second electronic control units 20 and 30, it communicates with these electronic control units to read their ID codes, and recognizes their models based on the read ID codes.

Note that a product ID, failure code, and the like may be set in addition to the ID code, and is displayed when a failure or the like has occurred, thus allowing a dealer or manufacturer to make a quick response. The product ID or failure code may be displayed only when a given key code is input at the dealer or manufacturer.

Other Application Examples of Control Panel and First to Third Electronic Control Units Other application examples of the control panel and the first to third electronic control units will be explained below.

Figure 11:
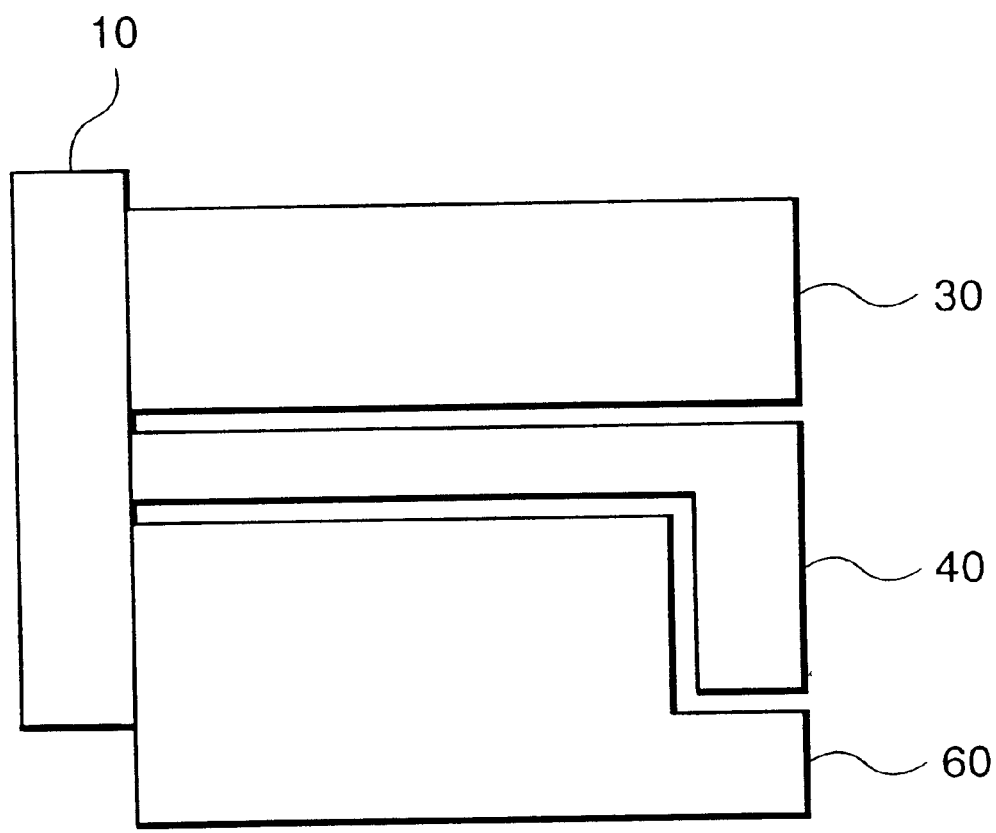
FIG. 11 is a schematic side view for explaining another application example of the control panel and first to third electronic control units.

In this embodiment, as shown in FIG. 11, the base chassis 1 has an open upper end and/or lower end, and the first and second electronic control units 20 and 30 are attached from the upper or lower ends of the base chassis 1. With this structure, another electronic control unit can be additionally mounted. Even when the size (especially, the thickness) of the first or second electronic control unit 20 or 30 increases, it can be prevented from stretching outside the base chassis 1. Note that a large inner space of the base chassis 1 need not be assured in advance, and downsizing of the vehicle electronic system can be achieved.

Furthermore, when the attachment cavity PI of the instrument panel P shown in FIG. 3 is formed to be larger in advance, a large MD player 60 with an MD changer function, which has a nearly double height, can be mounted.

Figure 12:
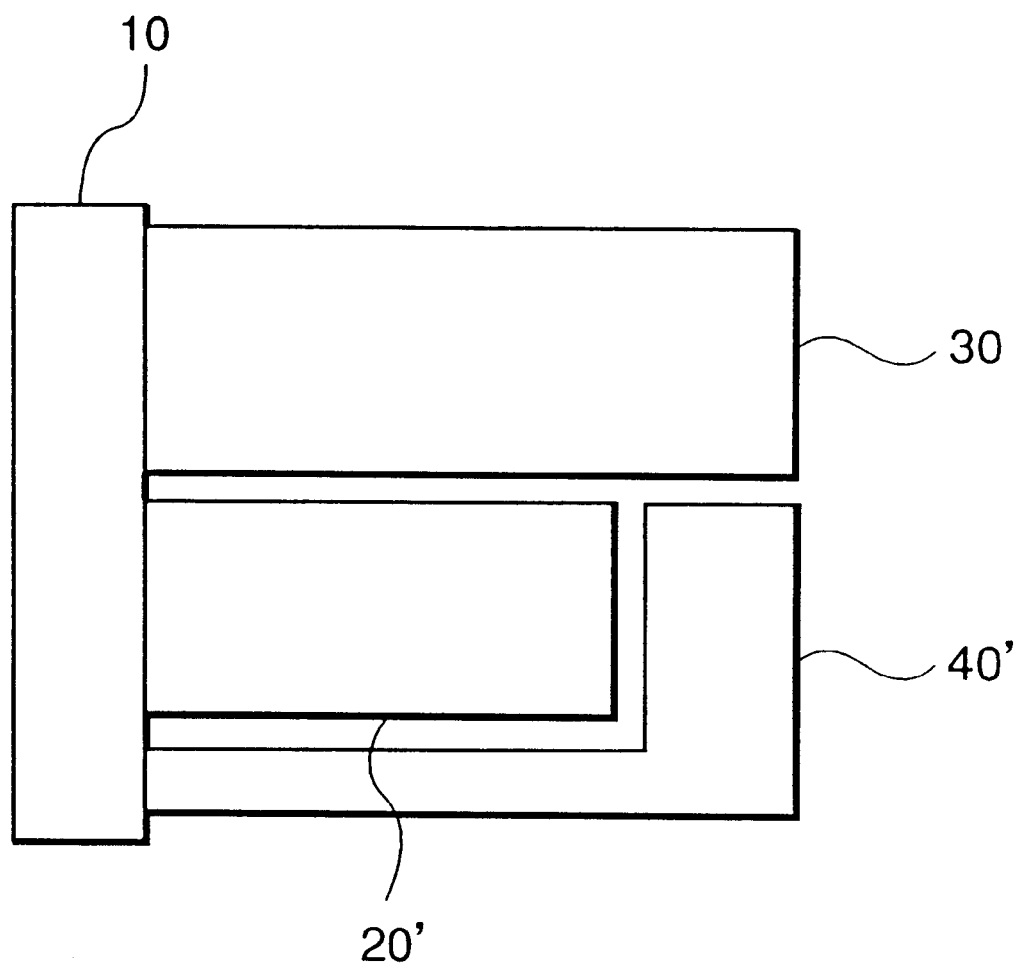
FIG. 12 is a schematic side view for explaining a problem posed upon laying out the control panel and first to third electronic control units.
Figure 13:
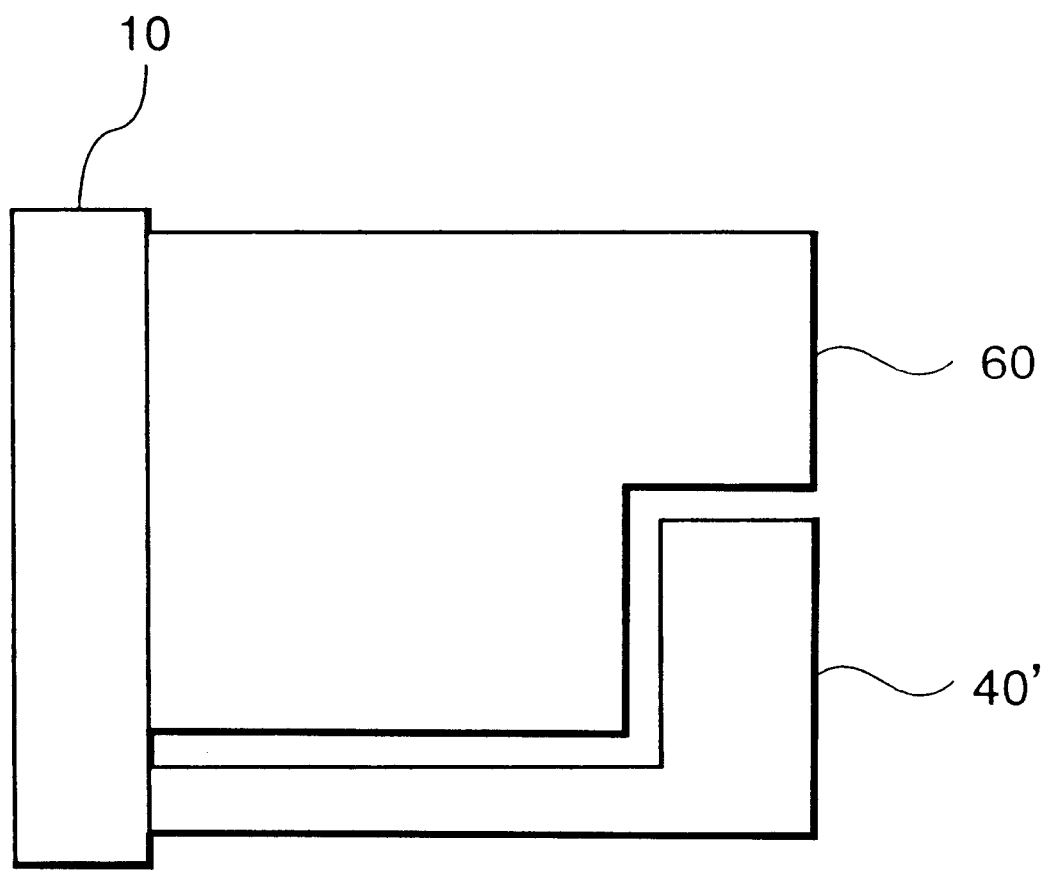
FIG. 13 is a schematic side view for explaining a problem posed upon laying out the control panel and first to third electronic control units.

The upper end and/or lower end of the base chassis 1 are/is opened to eliminate the following shortcomings. That is, in an arrangement in which a first electronic control unit 20' is housed in a recess with an upper opening of a third electronic control unit 40', as shown in, e.g., FIG. 12, if the second electronic control unit 30 is placed above the first electronic control unit 20', a large-size unit such as an MD unit with an MD changer function cannot be mounted. On the other hand, when a large-size unit such as an MD unit 60 with an MD changer function is placed in the recess of the third electronic control unit 40', as shown in FIG. 13, other units cannot be mounted.

Figure 14:
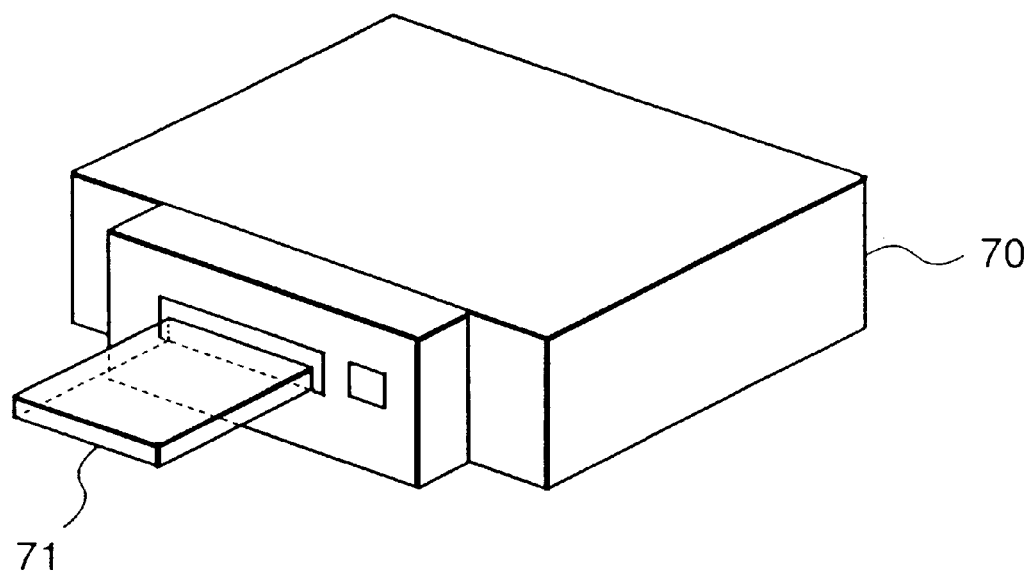
FIG. 14 is a schematic side view for explaining still another application example of the control panel and first to third electronic control units.

As the first electronic control unit 20, for example, a solid audio unit 70 using a storage medium 71 such as a memory stick 71 or the like that incorporates a semiconductor memory may be used, as shown in FIG. 14.

Figure 16:
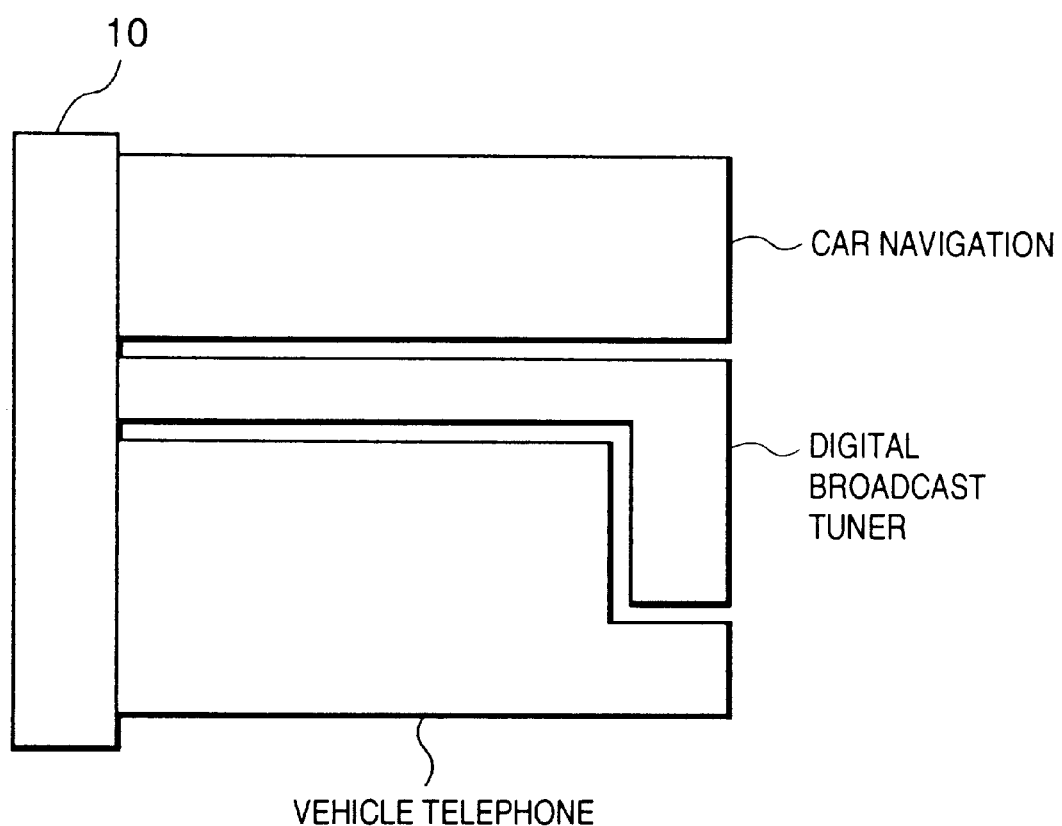
FIG. 16 is a schematic side view for explaining still another application example of the control panel and first to third electronic control units.

As other combinations of vehicle electronic control units, a TFT LCD display may replace the control panel, as shown in FIG. 15, or a vehicle telephone system or solid audio unit may be used as the first electronic control unit and a DVD, digital satellite tuner, car navigation system, or the like may be used as the second electronic control unit, as shown in FIG. 16.

Figure 17:
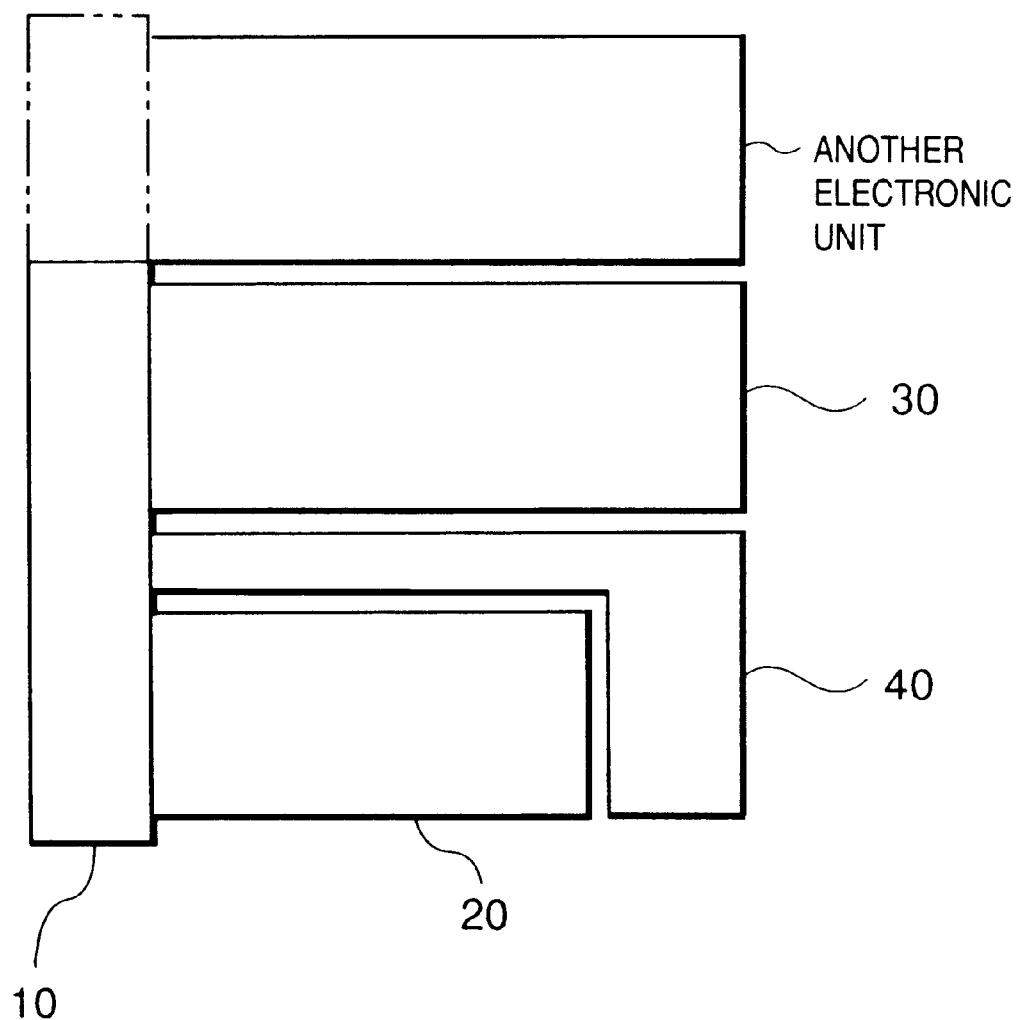
FIG. 17 is a schematic side view for explaining still another application example of the control panel and first to third electronic control units.

Furthermore, another electronic control unit such as a vehicle telephone system, digital broadcast tuner, or the like, which does not use any storage medium may be placed above the second electronic control unit 30, as shown in FIG. 17, thus laying out a plurality of electronic control units in multiple stages. The other electronic control unit has upper and lower connectors at the same positions as those of the first and second electronic control units, so as to be connected to the third electronic control unit. Also, a control panel with a larger height may be formed in advance for the multiple-stage layout.

Figure 18:
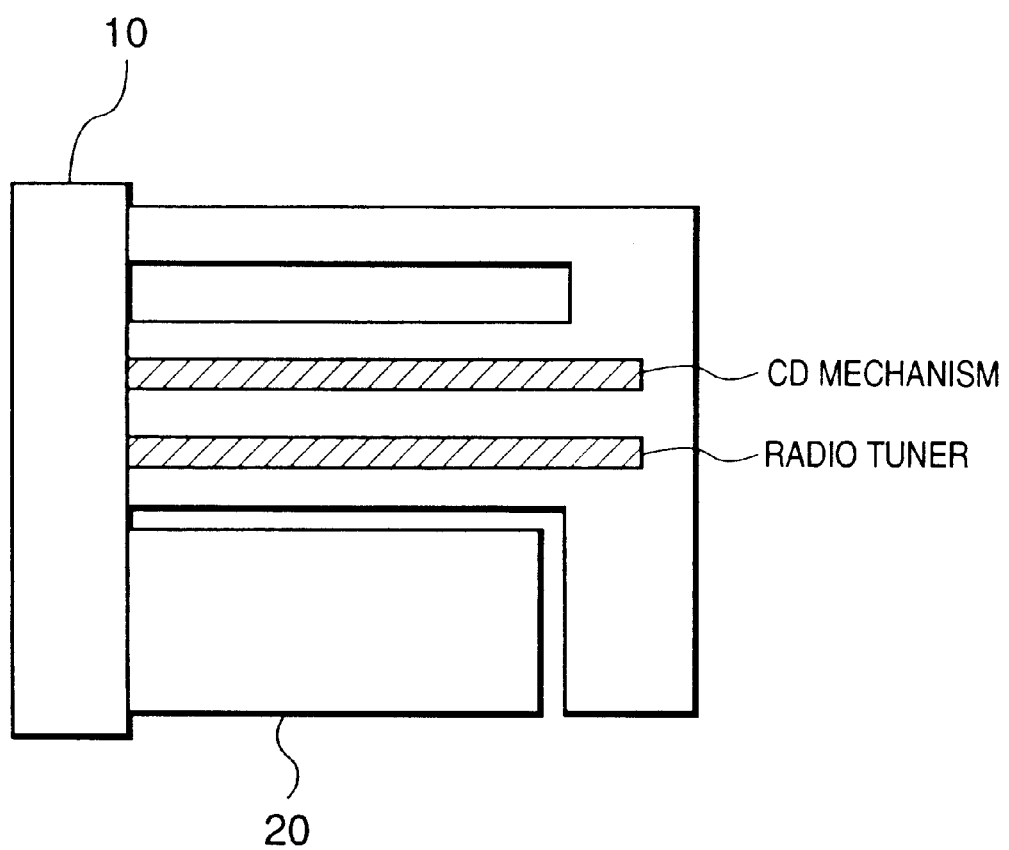
FIG. 18 is a schematic side view for explaining still another application example of the control panel and first to third electronic control units.

When the first and second control units have a 2DIN size, and a maximum of two electronic control units can be mounted, a larger number of modules can be mounted by integrating the two modules. The modules to be integrated can be determined based on higher integration requirements in consideration of cost (the cost may be lower if modules are not integrated) and market needs. For example, in the United States in which a CD player is normally equipped as a standard module, the housing cost and weight can be further reduced by integrating a radio tuner and CD mechanism, as shown in FIG. 18.

Figure 20:
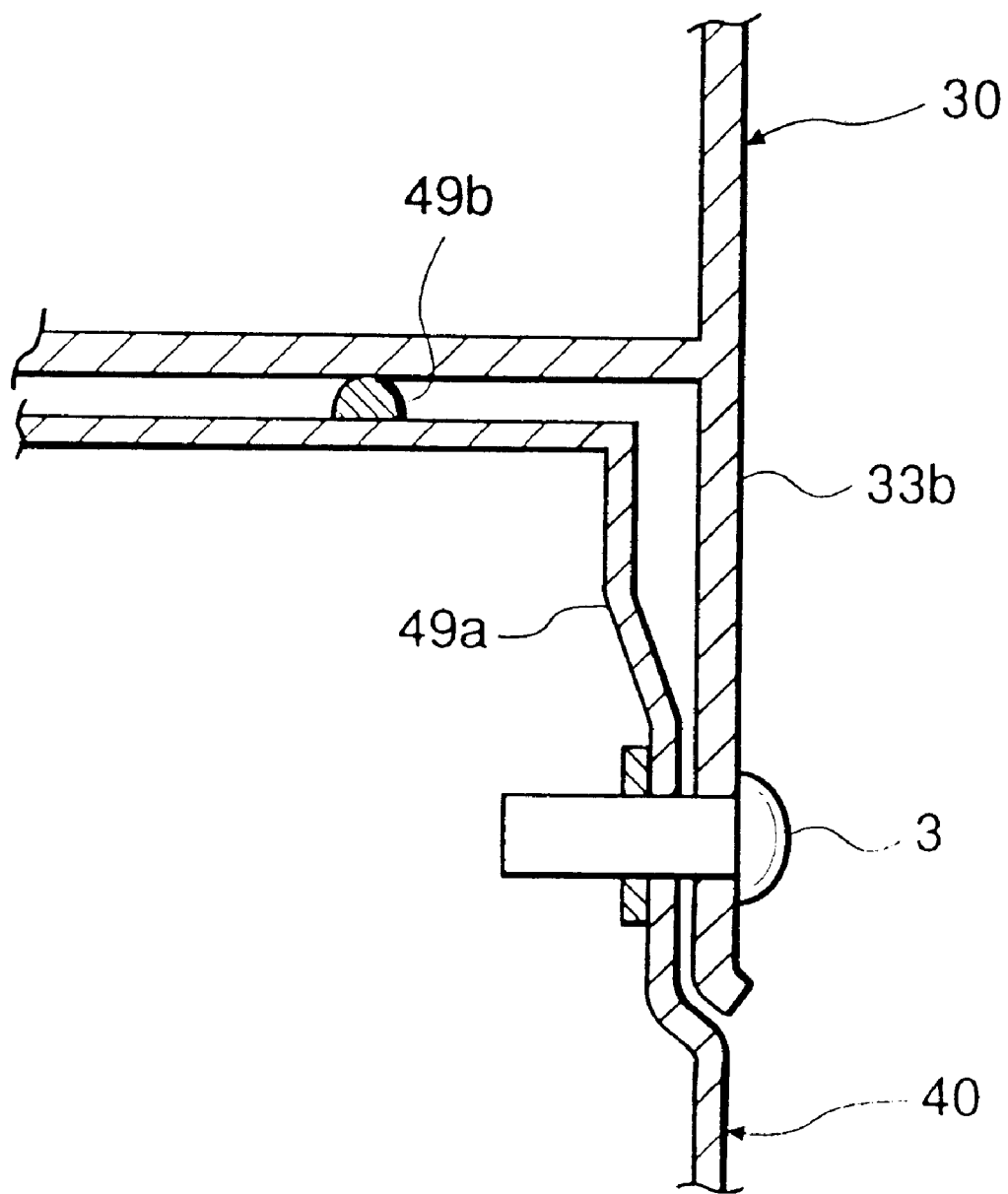
FIG. 20 is a sectional view taken along a line A—A in FIG. 19.
Figure 21:
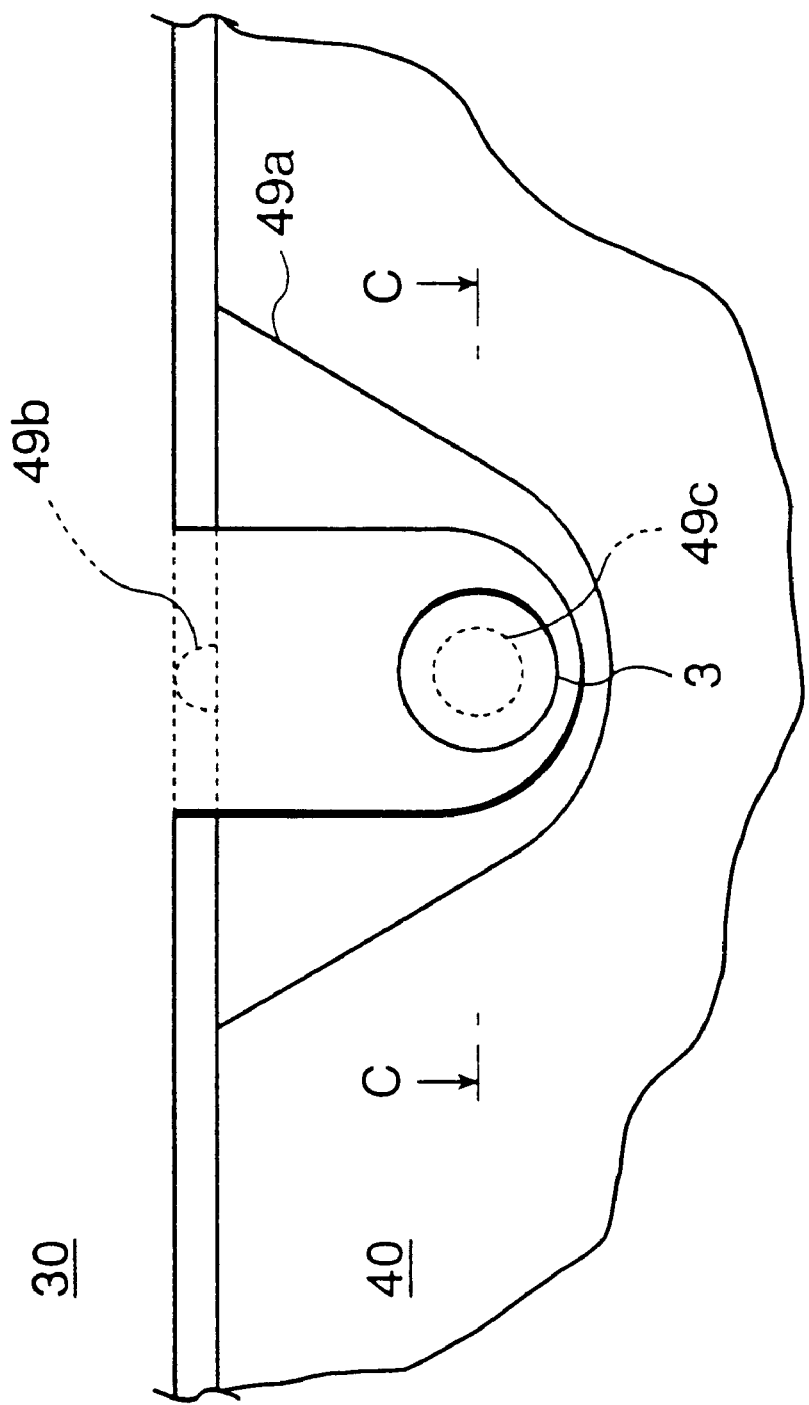
FIG. 21 is a side view of FIG. 20.
Figure 22:
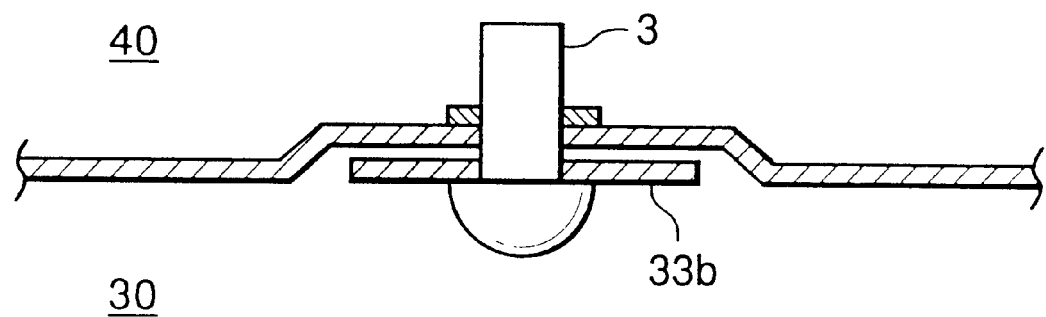
FIG. 22 is a sectional view taken along a line B—B in FIG. 21.
Figure 23:
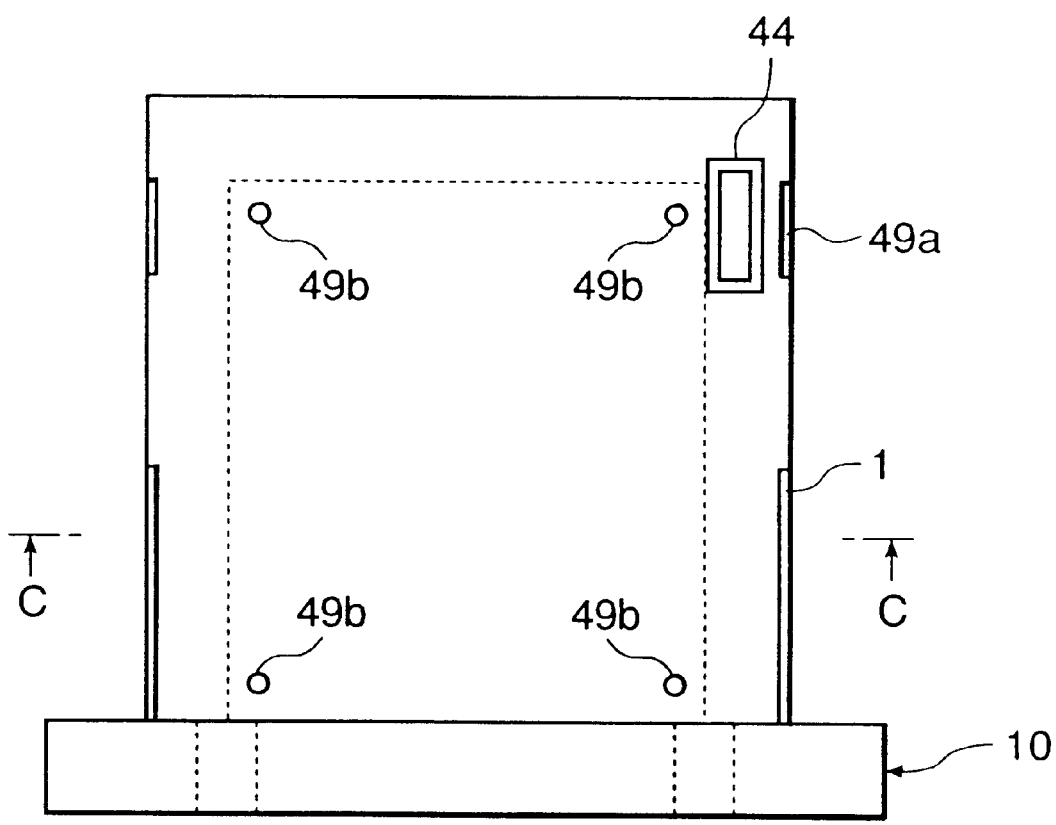
FIG. 23 is a plan view of the third electronic control unit and control panel.
Figure 24:
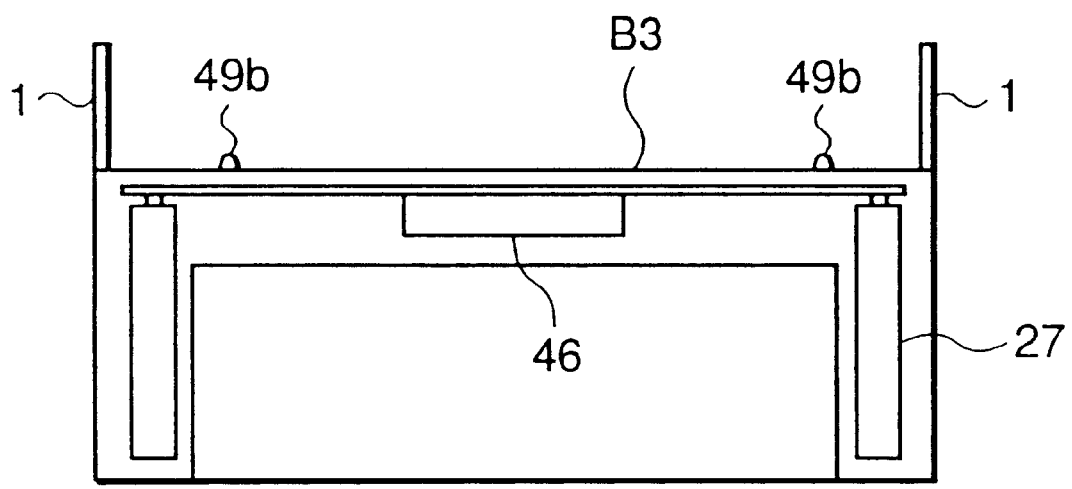
FIG. 24 is a sectional view taken along a line C—C in FIG. 23.
Figure 25:
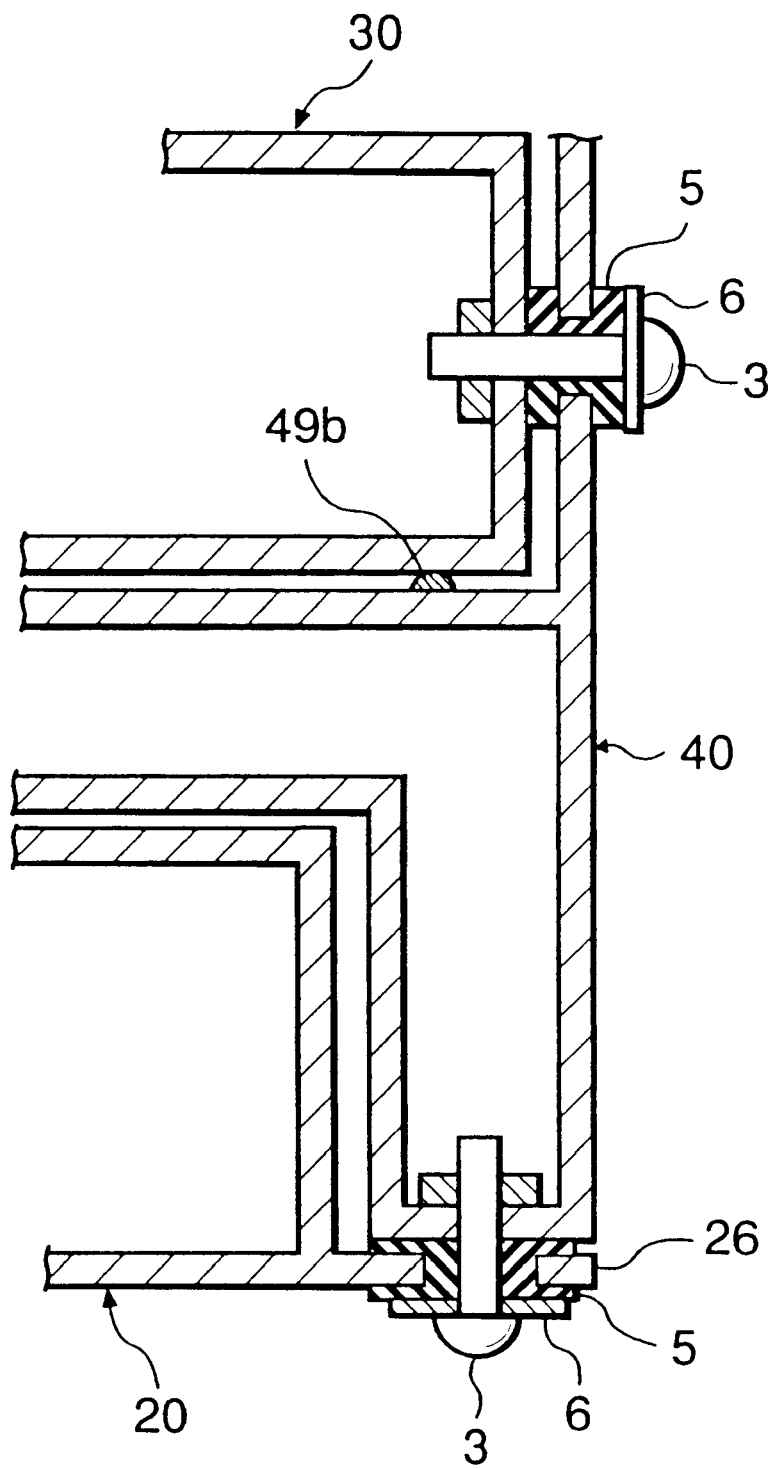
FIG. 25 is a partial sectional view showing the support structure of the first to third electronic control units.

FIG. 19 is a perspective view showing the housing mechanism and attachment structure of the first to third electronic control units. FIG. 20 is a sectional view taken along a line A—A in FIG. 19. FIG. 21 is a side view of FIG. 20. FIG. 22 is a sectional view taken along a line B—B in FIG. 21. FIG. 23 is a plan view of the third electronic control unit and control panel. FIG. 24 is a sectional view taken along a line C—C in FIG. 23. FIG. 25 is a partial sectional view showing the support structure of the first to third electronic control units.

As shown in FIGS. 19 to 24, elongated heat radiation holes 27*a*, 27*b*, 34, and 48 that communicate with the interior and exterior of the housings are formed on the respective electronic control units to improve heat radiation performance.

More specifically, a plurality of heat radiation holes 27*a* and 27*b* are formed on the housing 20A of the first electronic control unit 20 placed below the third electronic control unit 40. These heat radiation holes 27*a* and 27*b* are formed on portions except for that portion which corresponds to a CPU 28 built in the first electronic control unit 20. With this structure, although heat produced by the CPU 28 in the first electronic control unit 20 normally flows upward, any adverse influences on the most important third electronic control unit 40 which is the center of the vehicle electronic system (if the third electronic control unit fails due to heat, switch operations may cease to be accepted at all) and is located above the first electronic control unit 20 can be minimized.

The heat radiation holes 27*b* are formed on the side surface of the housing 20A of the first electronic control unit 20, the heat radiation holes 34 are formed on the side surface of the housing of the second electronic unit 30, and the heat radiation holes 48 are formed on the side surface of the projection 41 of the third electronic control unit 40 at positions corresponding to those of the heat radiation hole 27*b* of the first electronic control unit 20. With these holes, the heat radiation performance of the first electronic control unit 20 placed under the third electronic control unit 40 can be improved.

The base chassis 1 has reference attachment portions 49*a* serving as reference positions upon attaching the first and second electronic control units 20 and 30, and error allowing attachment portions 2*a* and 2*b* which are formed at positions different from the reference attachment portion 49*a* and are used for attaching the first and second electronic control units 20 and 30 while allowing certain position errors. The connector of at least one of the first and second electronic control units 20 and 30 is laid out to be closer to the reference attachment portions 49*a* than the error allowing attachment portions 2*a* and 2*b*, thus reliably aligning the connectors and preventing breakage or the like upon connection.

While the second electronic control unit 30 is placed above the third electronic control unit 40, attachment portions 33*b* projecting downward from the second electronic control unit 30 are fixed to reference attachment holes 49*c* of the base chassis 1 by attachment screws 3, and the right and left error allowing attachment holes 2*b* and 2*a* are fixed to attachment holes 33*a* of the second electronic control unit 30 by attachment screws 3. In this case, the second and third electronic control units 30 and 40 are aligned by adjusting the positions of the attachment portions 33*b* to alignment recesses 44*a,* thus easily aligning the connectors of the respective electronic control unit and preventing breakage of the connectors. Also, when the connector 44 is placed in the vicinity of the reference attachment holes 49*c,* errors can be suppressed.

The left error allowing attachment hole 2*a* is an elongated hole which is elongated in the back-and-forth direction of the electronic control unit to align the position in the up-and-down direction, and to allow errors in the back-and-forth direction. On the other hand, the right error allowing attachment hole 2*b* of the base chassis 1 has a diameter larger than that of the reference attachment hole 49*c* to allow errors. Furthermore, one hole of the attachment portions 33*b* of the second electronic control unit 30 is formed to be an elongated hole which is elongated in the back-and-forth direction of the electronic control unit to allow errors in the back-and-forth direction.

Moreover, projections 49*b* are formed at four positions on the upper surface of the third electronic control unit 40 to support the second electronic control unit 30 by points to prevent cluttering between the electronic control units. Also, the gap between the two electronic control units serves as an air circulating path, thus improving ventilation performance.

The first electronic control unit 20 is aligned to the third electronic control unit 40 while being guided by the recesses of the third electronic control unit 40, so as to allow easy connection of the connectors, and the attachment portions 26 of the first electronic control unit 20 are fixed to the projections of the third electronic control unit by attachment screws 3. The slits 27*a* and 27*b* of the first electronic control unit 20 are formed on the side surface and upper surface of the housing, and no slit is formed at a position corresponding to the CPU 28 in the housing so as not to readily conduct heat of the CPU to the third electronic control unit. The positions of the slits 27*b* formed on the side surface of the housing of the first electronic control unit 20 are matched with those of the slits 48 formed on the side surface of the housing of the third electronic control unit 40, thus improving the heat radiation performance.

As shown in FIG. 25, the second and third electronic control units 30 and 40 are fixed by attachment screws 3 on their side surfaces of the housings via thick rubber bushings 5 which can fill the gap between the housings and washers 6. Also, the first and third electronic control units 20 and 40 are fixed by attachment screws 3 at their bottom surfaces of the housing via thick rubber bushings 5 which can fill the gap between the housings and washers 6.

The allowable error width of an elastic member along the fitting direction of the connector of at least one of the first and second electronic control units 20 and 30, and that of the third electronic control unit is set to be smaller than the allowable error width in directions other than that fitting direction. With this structure, any deviations in a direction that does not require a large allowable width upon fitting the connectors can be reduced to improve the attachment strength.

That is, the thickness of each rubber bushing 5 is set so that the allowable error width of the motion of the first and second electronic units in the up-and-down direction (connector fitting direction) becomes smaller than that of movement in the back-and-forth and right-and-left directions.

As a result, even when the relative positions between male and female connectors deviate from each other, the rubber bushings can absorb such errors, thus preventing the connectors from breaking and extra stress from acting.

Connector Connection Structure

Figure 26:
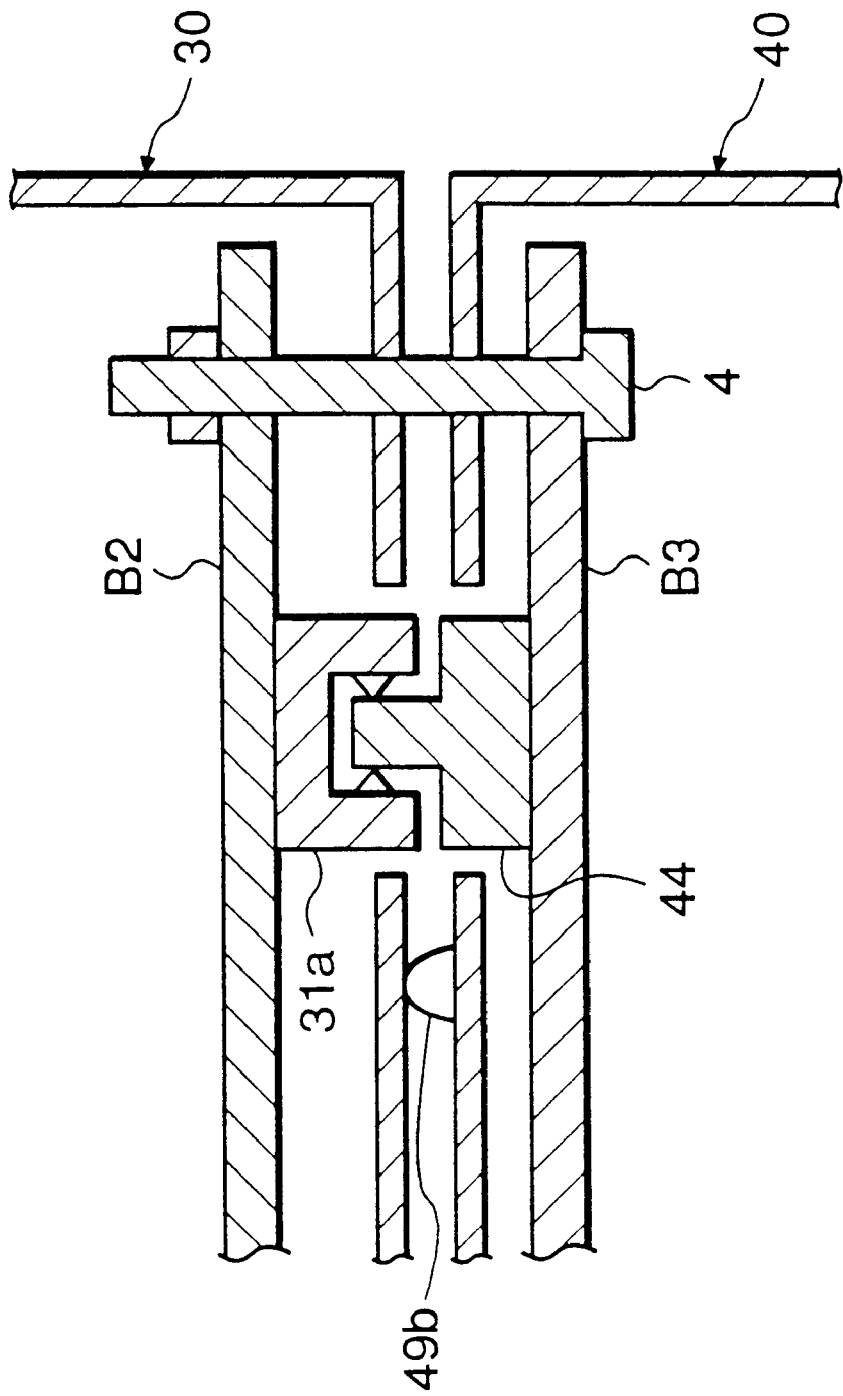
FIG. 26 is a sectional view showing the connector connection structure of the second and third electronic control units.
Figure 27:
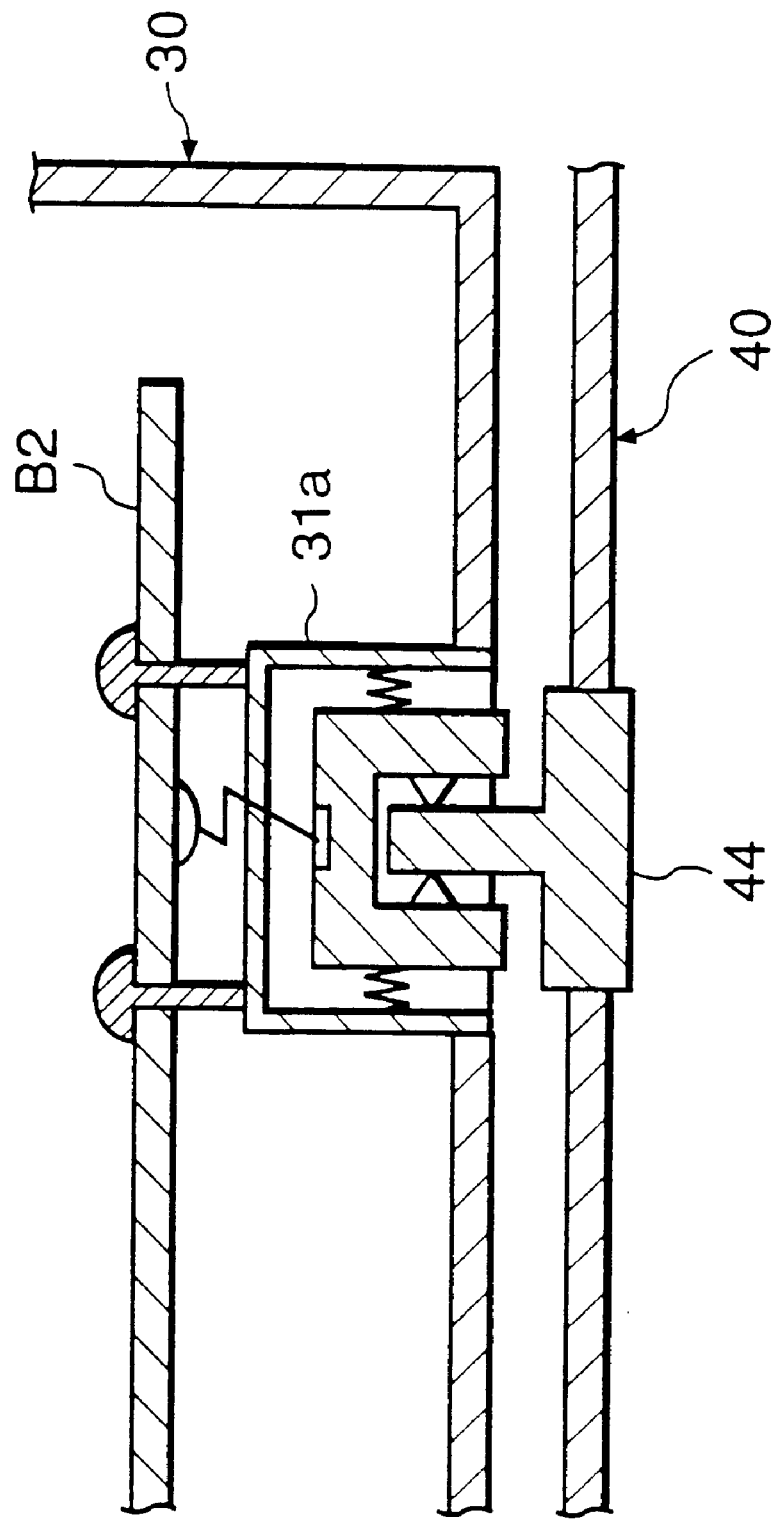
FIG. 27 is a sectional view showing the connection structure of a floating connector.

FIG. 26 is a sectional view showing the connector connection structure between the second and third electronic control units. FIG. 27 is a sectional view showing the connection structure using a floating connector.

As shown in FIG. 26, the second electronic control unit 30 is fixed to a board B2 to have a female connector 31a, the third electronic control unit 40 is fixed to the board B3 to have a male connector 44, and the height of each projection 49b is set so that the distal end of the male connector 44 does not contact the bottom portion of the female connector 31a, thus preventing the connectors from breaking due to the load which acts downward from the second electronic unit 30.

Also, as shown in FIG. 27, the second electronic unit 30 is supported by the board B2 in a floating state to have a female connector 31a, and the third electronic control unit 40 is fixed to the board B3 to have a male connector 44, thus preventing the connectors from breaking due to relative movements between the two electronic control units 30 and 40.

The female connector 31a is supported by elastic members such as springs or the like to be movable in the back-and-forth, right-and-left, and up-and-down directions while being connected to the board B2, so as to absorb relative deviations between the two electronic control units.

Since the circuit board B3 built in the third electronic control unit 40 and the circuit board B2 built in the second electronic control unit 30 (or the circuit board B3 built in the third electronic control unit 40 and a circuit board B1 built in the first electronic control unit 20) are directly fixed and held by set screws 4, even when vibrations have been produced, the connectors can be prevented from receiving an extra load due to the vibrations, since the circuit boards are directly fixed to each other. On the other hand, a method of supporting the connector itself in a floating state is known to those who are skilled in the art, but the floating structure must support a very small connector in a floating state, resulting in increased cost. However, the structure of the present invention can take a measure against vibration with lower cost than the floating structure.

Control of Third Electronic Control Unit

Figure 28:
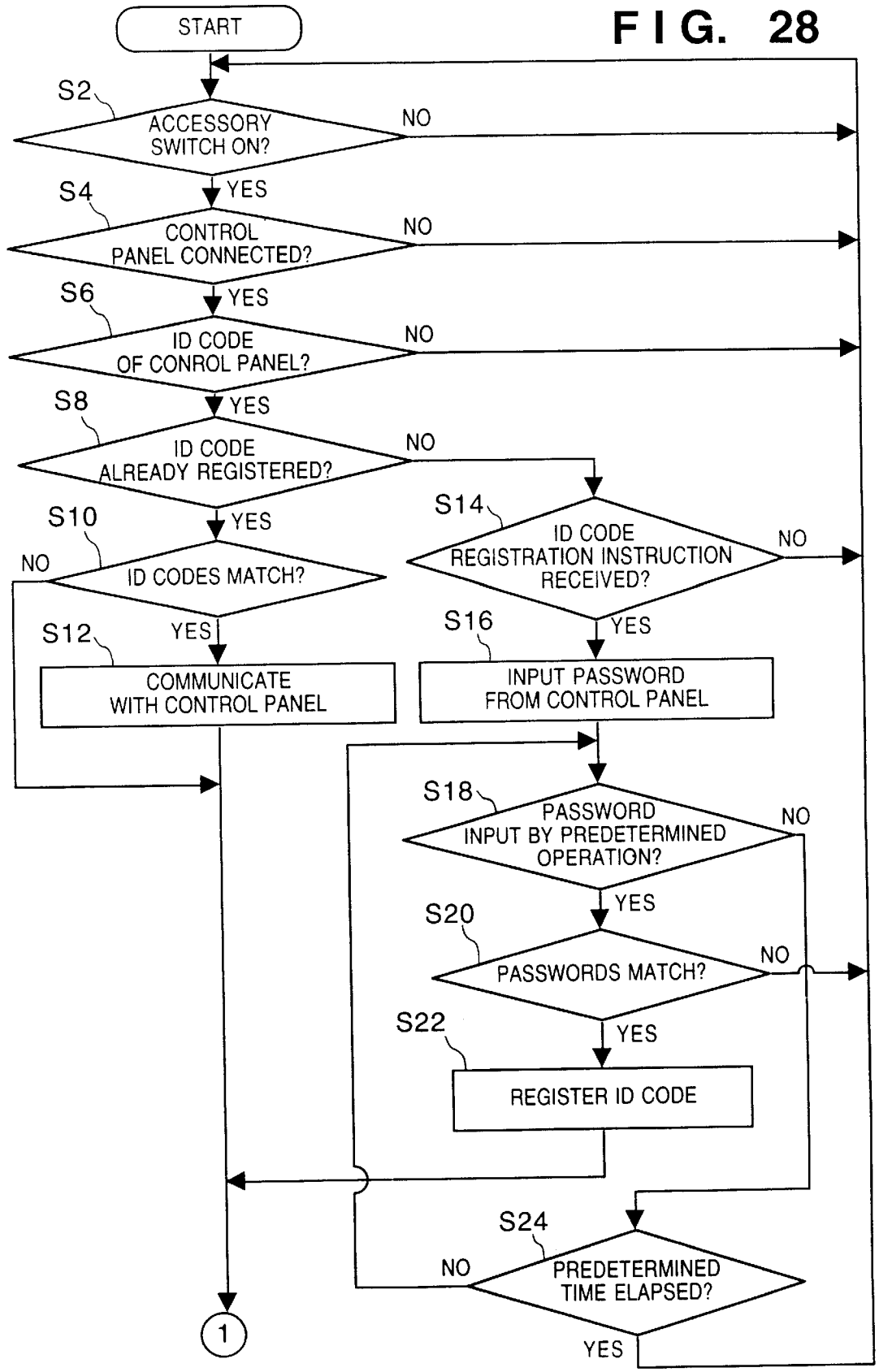
FIG. 28 is a control flow chart of the third electronic control unit.
Figure 29:
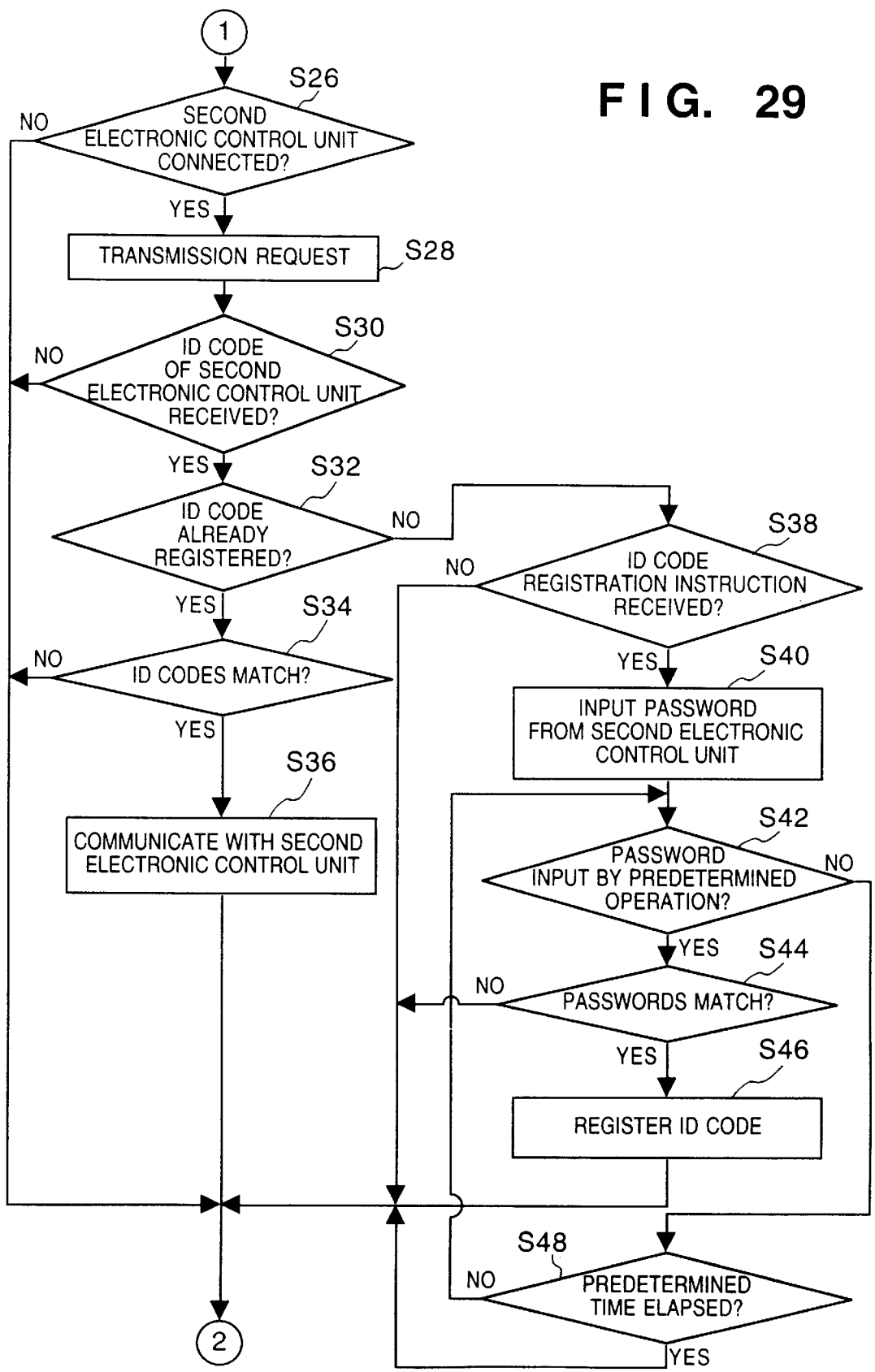
FIG. 29 is a control flow chart of the third electronic control unit.
Figure 30:
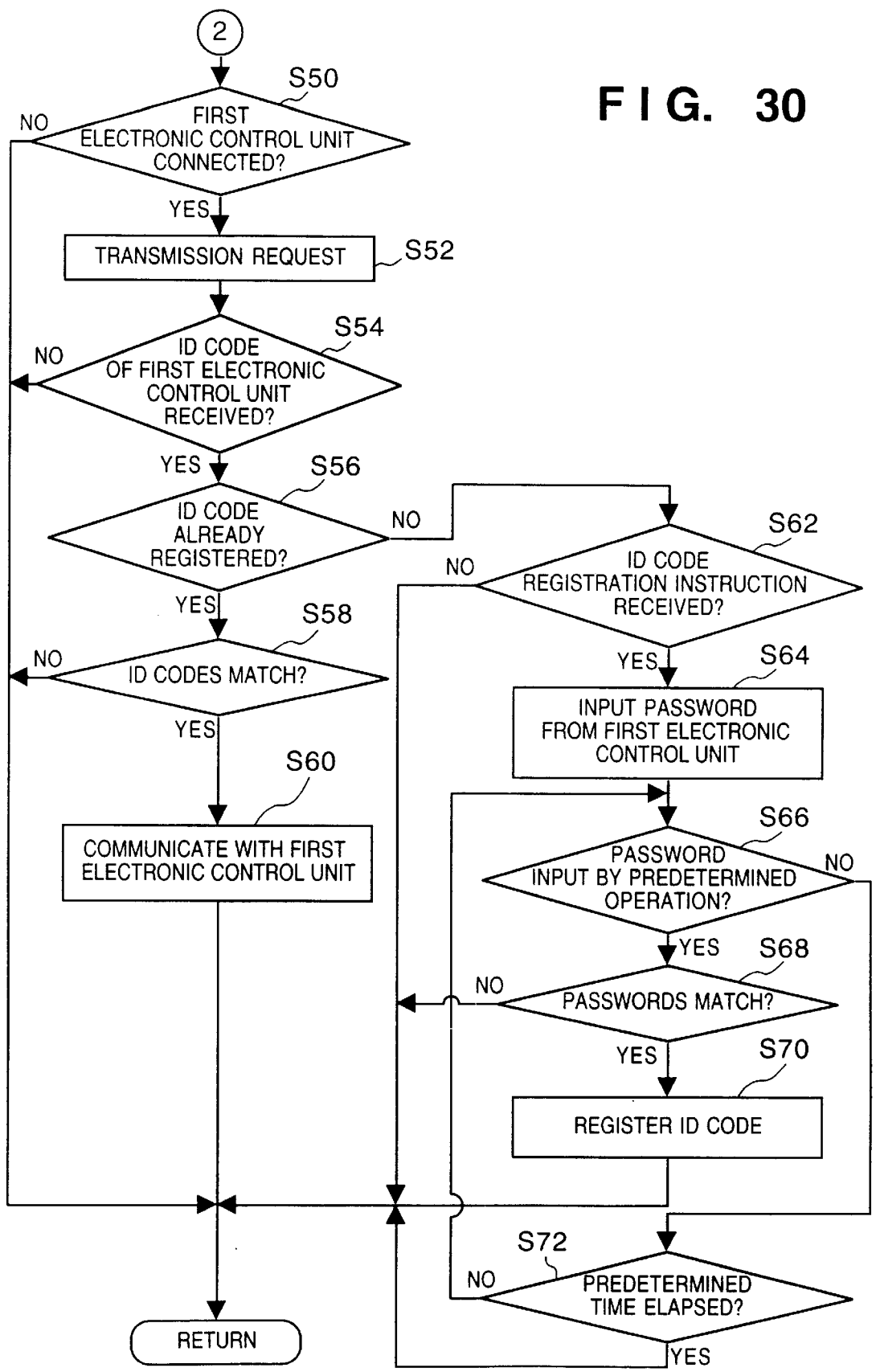
FIG. 30 is a control flow chart of the third electronic control unit.

FIGS. 28 to 30 are control flow charts of the third electronic control unit.

As shown in FIGS. 28 to 30, while the third electronic control unit is electrically connected to the vehicle body side, if an accessory (ACC) switch is turned on in step S2, the control panel is electrically connected in step S4, and an ID code is received from the control panel in step S6 (YES in steps S2, S4, and S6), it is checked in step S8 if the ID code of the control panel has already been registered in the third electronic control unit. If it is determined in step S8 that the ID code has already been registered (YES in step S8), it is checked in step S10 if the ID code matches that registered in the third electronic control unit. If it is determined in step S10 that the two ID codes match each other (YES in step S10), in step S12 the third electronic control unit can communicate with the control panel to control the display device, and outputs control signals to the first and second electronic control units in accordance with switch signals input from the control switches. On the other hand, if it is determined in step S10 that the two ID codes do not match each other (NO in step S10), the flow advances to step S26 in FIG. 29.

On the other hand, if it is determined in step S8 that the ID code has not been registered yet (NO in step S8), the flow advances to step S14 to check if an ID code registration instruction signal is received from the control panel. If it is determined in step S14 that the ID code registration instruction signal is received (YES in step S14), the flow advances to step S16 to input a password registered in advance in the control panel.

It is checked in step S18 if a password is input from the control switch on the control panel. If it is determined in step S18 that the password is input (YES in step S18), it is checked in step S20 if the password input in step S16 matches that input in step S18. If it is determined in step S20 that the two passwords match each other (YES in step S20), the ID code is registered in the third electronic control unit in step S22.

In step S18, the third electronic control unit waits for the password input from the control switch until a predetermined period of time elapses.

It is checked in step S26 in FIG. 29 if the second electronic control unit is electrically connected. If it is determined in step S26 that the second electronic control unit is mounted (YES in step S26), the third electronic control unit sends an ID code request signal to the second electronic control unit in step S28.

It is checked in step S30 if an ID code is received from the second electronic control unit. If it is determined in step S30 that the ID code is received from the second electronic control unit (YES in step S30), the flow advances to step S32. On the other hand, if it is determined in step S30 that the ID code is not received (NO in step S30), the flow advances to step S50 in FIG. 30.

It is checked in step S32 if the ID code of the second electronic control unit has already been registered in the third electronic control unit. If it is determined in step S32 that the ID code has already been registered (YES in step S32), it is checked in step S34 if the ID code matches that registered in the third electronic control unit. If it is determined in step S34 that the two ID code match each other (YES in step S34), in step S36 the third electronic control unit can communicate with the second electronic control unit to control the display device and outputs control signals corresponding to switch signals from the control switches to the second electronic control unit. On the other hand, if it is determined in step S34 that the two ID code do not match each other (NO in step S34), the flow advances to step S50 in FIG. 30.

If it is determined in step S32 that the ID code has not been registered yet (NO in step S32), the flow advances to step S38 to check if an ID code registration instruction signal is received from the control panel. If it is determined in step S38 that the ID code registration instruction signal is received (YES in step S38), the flow advances to step S40 to input a password registered in advance in the second electronic control unit.

It is checked in step S42 if a password is input from the control switch of the control panel. If it is determined in step S42 that the password is input (YES in step S42), it is checked in step S44 if the password input in step S40 matches that input in step S42. If it is determined in step S44 that the two passwords match each other (YES in step S44), the ID code is registered in the third electronic control unit in step S46.

In step S48, the third electronic control unit waits for the password input from the control switch until a predetermined period of time elapses.

It is checked in step S50 in FIG. 30 if the first electronic control unit is electrically connected. If it is determined in step S50 that the first electronic control unit is mounted (YES in step S50), an ID code request signal is sent to the first electronic control unit in step S52.

It is checked in step S54 if an ID code is received from the first electronic control unit. If it is determined in step S54 that the ID code is received from the first electronic control unit (YES in step S54), the flow advances to step S56. On the other hand, if it is determined in step S54 that the ID code is not received (NO in step S54), the flow returns.

It is checked in step S56 if the ID code of the first electronic control unit has already been registered in the third electronic control unit. If it is determined in step S56 that the ID code has already been registered (YES in step S56), it is checked in step S58 if the ID code matches that registered in the third electronic control unit. If it is determined in step S58 that the two ID code match each other (YES in step S58), in step S60 the third electronic control unit can communicate with the first electronic control unit to control the display device, and outputs control signals corresponding to switch signals from the control switches to the first electronic control unit. On the other hand, if it is determined in step S58 that the two ID codes do not match each other (NO in step S58), the flow returns.

It is determined in step S56 that the ID code has not been registered yet (NO in step S56), the flow advances to step S62 to check if an ID code registration instruction signal is received from the control panel. If it is determined in step S62 that the ID code registration instruction signal is received (YES in step S62), the flow advances to step S64 to input a password registered in advance in the first electronic control unit.

It is checked in step S66 if a password is input from the control switch of the control panel. If it is determined in step S66 that the password is input (YES in step S66), it is checked in step S68 if the password input in step S64 matches that input in step S66. If it is determined in step S68 the two passwords match each other (YES in step S68), the ID code is registered in the third electronic control unit in step S70.

In step S72, the third electronic control unit waits for the password input from the control switch until a predetermined period of time elapses.

According to the aforementioned control, the control panel may be detached to be prevented from being stolen when the driver gets off or leaves the vehicle, but other electronic control units may be stolen. For this reason, ID codes are checked between the third electronic control unit 40, and the control panel 10 and the first and second electronic control units 20 and 30, and only when the ID codes match each other, they can communicate with each other. For this reason, even when the control panel or the electronic control unit is stolen, it cannot be used in another system.

More specifically, it is checked if the combination between the third electronic control unit 40 and at least one of the first and second electronic units 20 and 30 is the one registered in advance, and the third electronic control unit 40 communicates with at least one of the first and second electronic units 20 and 30 to inhibit execution of the control function of at least one of the first and second electronic units 20 and 30. Hence, even when one of the first to third electronic control units 20 to 40 is stolen, the control function of that unit is inhibited from being executed, thus providing a burglarproof function.

Furthermore, since the third electronic control unit 40 which is directly electrically connected to the first and second electronic control units 20 and 30 executes the aforementioned checking processes, the checking processes can be executed very easily.

Whether or not the ID code or password is to be identified can be selected by the user. As a selection method, for example, when identification of an ID code is canceled upon delivery of a product, the accessory switch may be turned on while holding down a predetermined switch so as to cancel that state (i.e., to identify the ID code). Also, various other methods may be used.

With this control, the electronic control units can be prevented from operating upon assembly of a product.

As other methods, (1) a power supply such as a capacitor or the like, which sustains itself for only a short period of time, is mounted in the third electronic control unit, and attachment/detachment of the electronic control unit is allowed until that power supply is used up; (2) the third electronic control unit checks a voltage at a predetermined terminal of a newly connected electronic control unit, and if the checked voltage is equal to or lower than a predetermined voltage, that electronic control unit is inhibited from being recognized; and (3) the third electronic control unit stores the number of times of attachment/detachment of other electronic control units, and inhibits communicates if that number of times has exceeded a predetermined value. However, communications are permitted if passwords match each other.

Control of Control Panel

Figure 31:
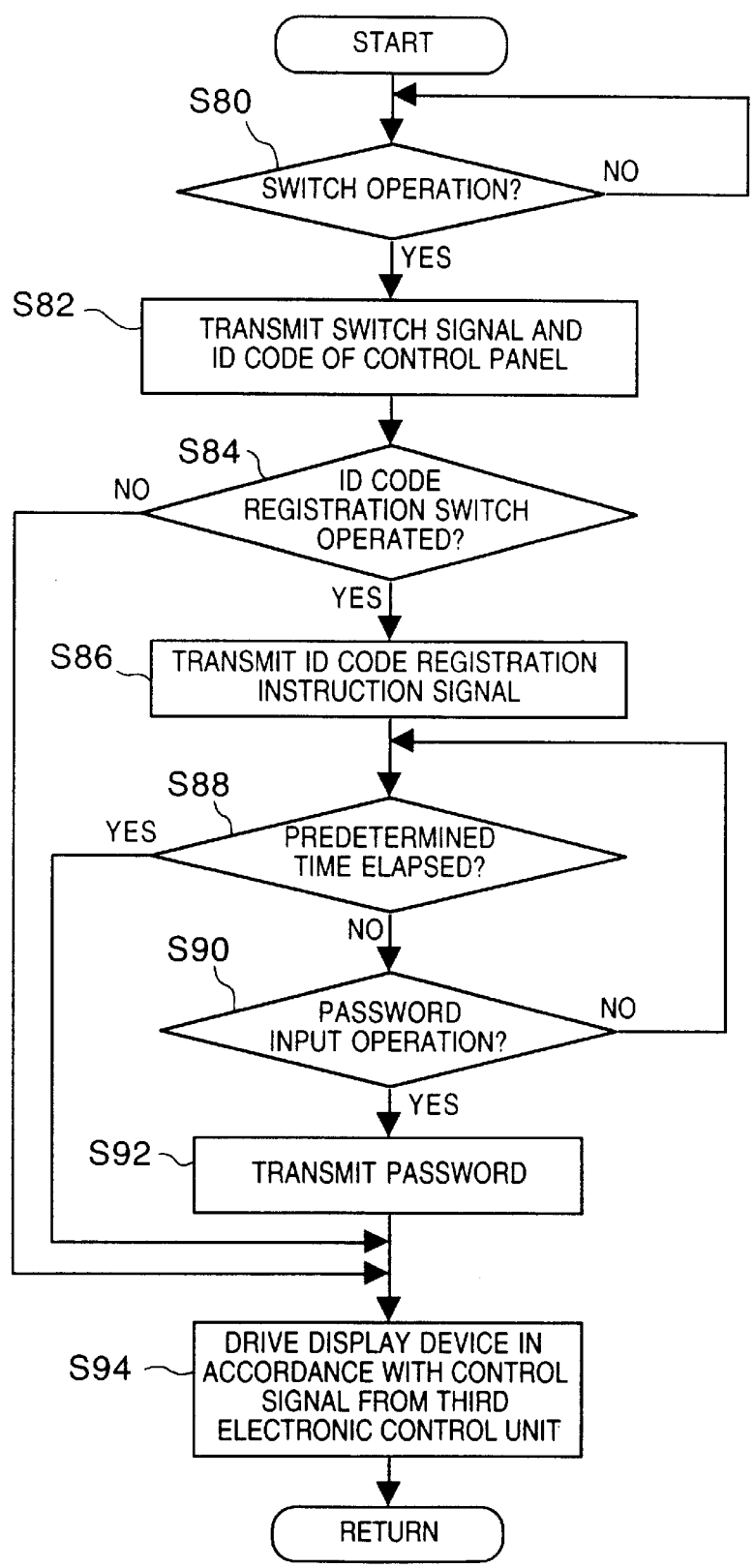
FIG. 31 is a control flow chart of the control panel.

FIG. 31 is a control flow chart of the control panel.

As shown in FIG. 31, while the control panel is electrically connected to the third electronic control unit, if switch operation is detected in step S80 (YES in step S80), a switch signal and the ID code of the control panel are sent to the third electronic control unit in step S82.

It is checked in step S84 if a registration switch of an ID code is operated. If it is determined in step S84 that the registration switch is operated (YES in step S84), an ID code registration instruction signal is sent to the third electronic control unit in step S86. If it is determined in step S84 that the registration switch is not operated (NO in step S84), the flow advances to step S94.

It is checked in step S88 if a predetermined period of time has elapsed. If it is determined in step S88 that the predetermined period of time has elapsed (YES in step S88), the flow advances to step S94; otherwise (NO in step S88), the flow advances to step S90.

It is checked in step S90 if password input operation is made before an elapse of the predetermined period of time. If input operation is made (YES in step S90), the flow advances to step S92; otherwise (NO in step S90), the flow returns to step S88.

In step S92, a password is sent to the third electronic control unit. In step S94, the display device is driven in accordance with control signals from the third electronic control unit.

Control of First Electronic Control Unit

Figure 32:
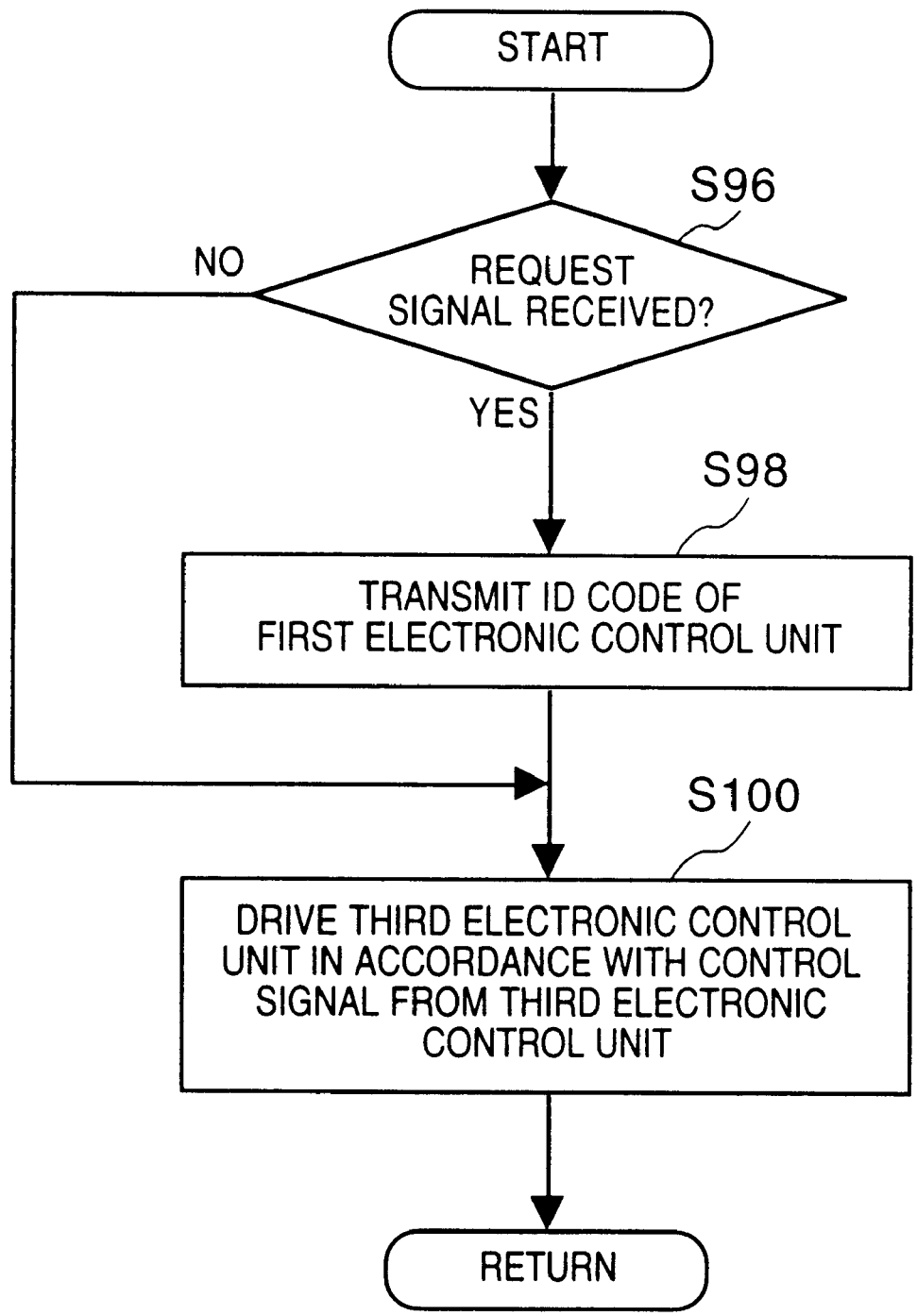
FIG. 32 is a control flow chart of the first electronic control unit.

FIG. 32 is a control flow chart of the first electronic control unit.

As shown in FIG. 32, while the first electronic control unit is electrically connected to the third electronic control unit, if it is determined in step S96 that a request signal is received from the third electronic control unit (YES in step S96), an ID code registered in advance in the first electronic control unit is sent to the third electronic control unit in step S98.

In step S100, the first electronic control unit is driven in accordance with control signals from the third electronic control unit.

Control of Second Electronic Control Unit

Figure 33:
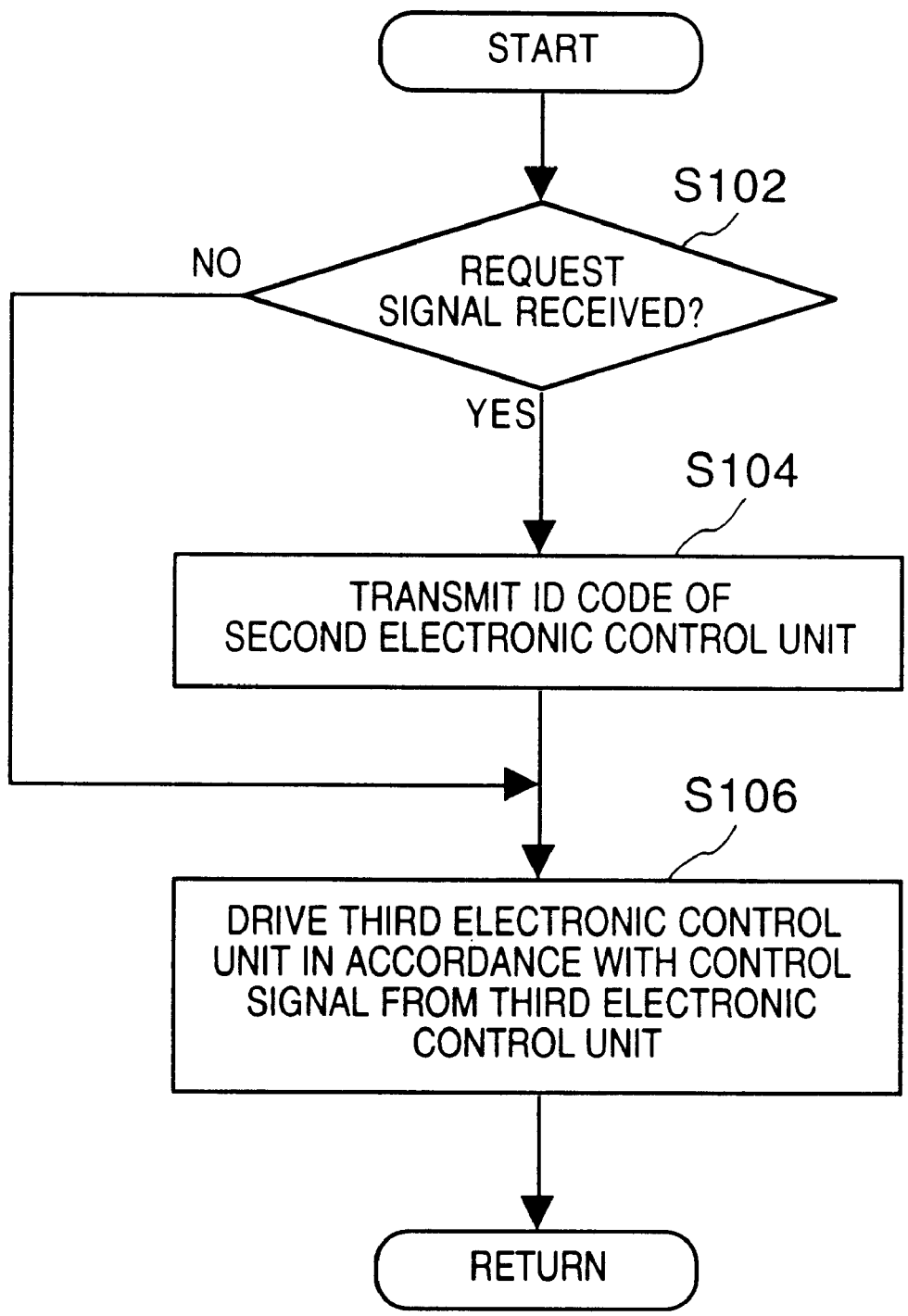
FIG. 33 is a control flow chart of the second electronic control unit.

FIG. 33 is a control flow chart of the second electronic control unit.

As shown in FIG. 33, while the second electronic control unit is electrically connected to the third electronic control unit, if it is determined in step S102 that a request signal is received from the third electronic control unit (YES in step S102), an ID code registered in advance in the second electronic control unit is sent to the third electronic control unit in step S104.

In step S106, the second electronic control unit is driven in accordance with control signals from the third electronic control unit.

Second Embodiment

Figure 34:
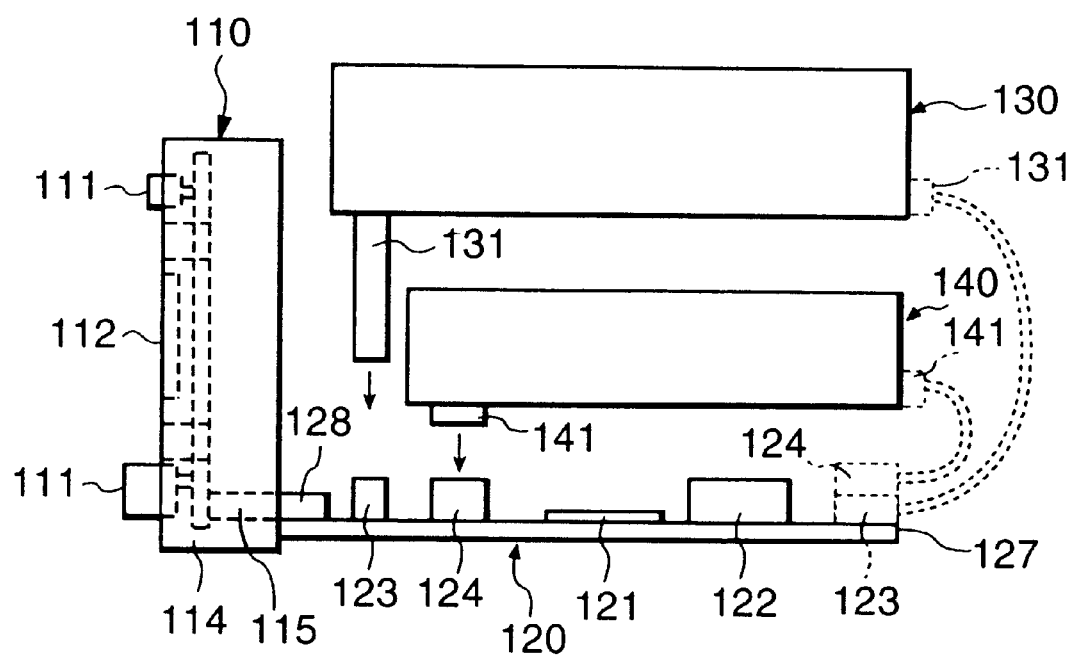
FIG. 34 is a schematic side view showing the arrangement of a vehicle electronic system according to the second embodiment of the present invention.
Figure 35:
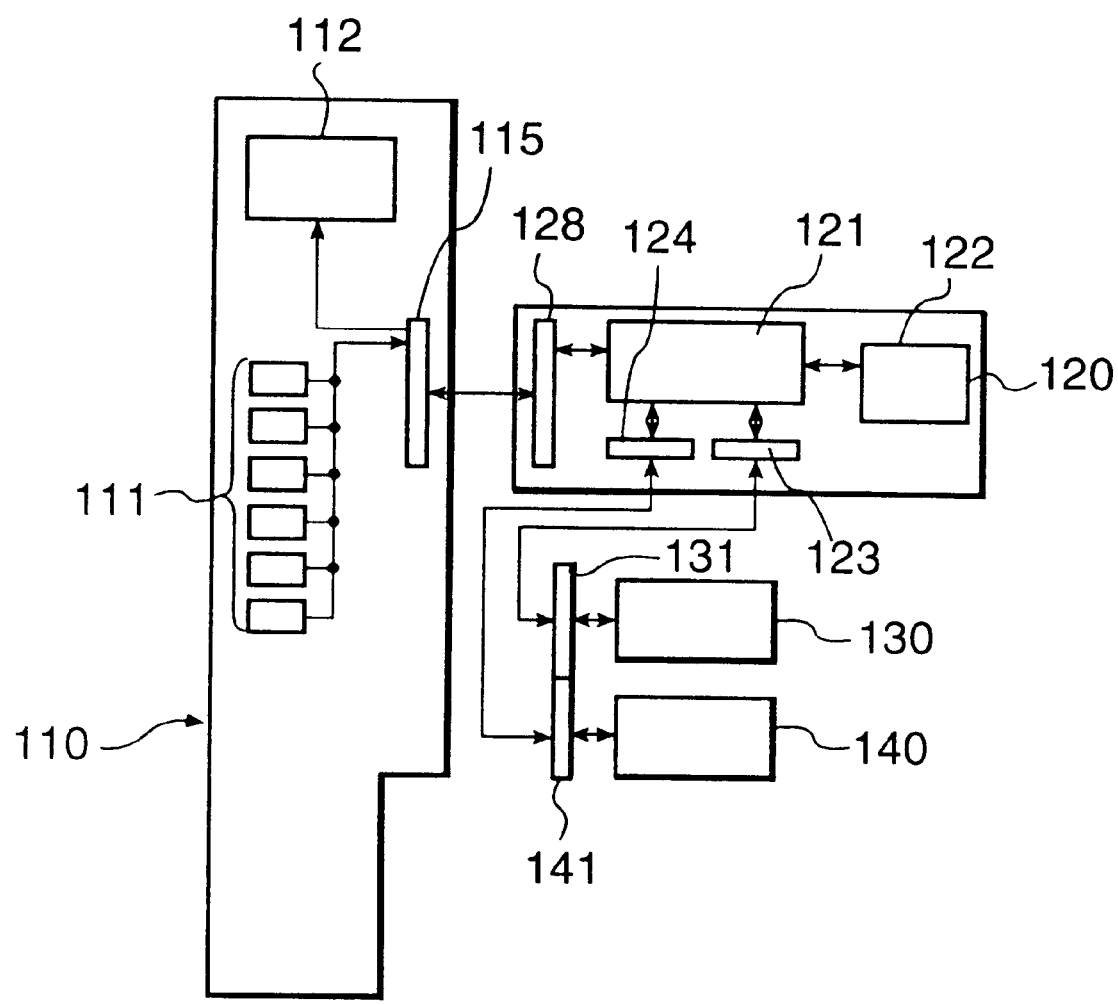
FIG. 35 is a block diagram showing the electrical arrangement of the vehicle electronic system shown in FIG. 34.
Figure 37:
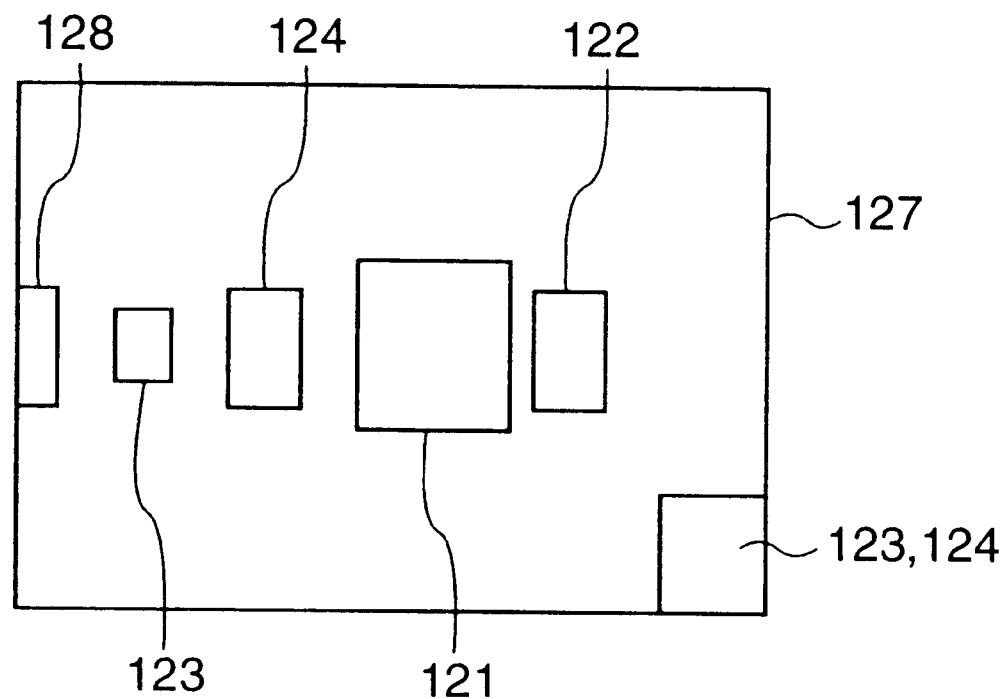
FIG. 37 is a view showing the layout of the respective electronic parts on a central control unit shown in FIG. 34.

FIG. 34 is a schematic side view showing the arrangement of a vehicle electronic system of the second embodiment. FIG. 35 is a block diagram showing the electrical arrangement of the vehicle electronic system shown in FIG. 34. FIG. 37 shows the layout of electronic components on a central control unit 120 shown in FIG. 34.

As shown in FIGS. 34, 35, and 37, the vehicle electronic system of the second embodiment comprises a central control unit 120 serving as a first electronic control unit having a radio tuner function, a CD control unit 130 serving as a second electronic control unit having a sound function such as a CD player or the like, which is different from the radio tuner function, and a design panel 110 which has a console and display for the central control unit 120 and CD control unit 130. On the rear surface (opposite to the interior of the passenger room) of the design panel 110, another sound unit 140 serving as a third electronic control unit having a sound function such as a cassette tape module, MD module or the like, which is different from the CD control unit 130, can be placed.

The design panel 110 has control switches 111 for controlling the respective sound units such as a radio, CD, cassette tape, MD, and the like, and a display panel 112 comprising an LCD or segment display unit for displaying operations of the respective units.

The central control unit 120 is independent from the design panel 110, and the design panel 110 and the central control unit 120 are detachably connected to each other via a connector 115 of the design panel, and a connector 128 of the central control unit 120. A circuit board 127 is laid out to be perpendicular to the design panel 110 and parallel to the CD control unit 130 and the other sound unit 140.

With this arrangement, since no opening through which a medium such as a CD, cassette tape, or the like is inserted need be formed on the board on which a CPU is mounted, the board size can be prevented from increasing. When design panels having different specifications are prepared in correspondence with destination countries or models of vehicles, the storage space of the respective sound units can be assured without redesigning the central control unit.

The control switches 111 and display panel 112 of the design panel 110 are electrically connected to the connector 115 of the central control unit 120 via a distribution frame 114.

The central control unit 120 and CD control unit 130 are electrically connected to each other via a connector 123 which projects upward from the central control unit 120, and a connector 131 which extends downward from the CD control unit 130. A CPU 121 of the central control unit 120 outputs control signals to the CD control unit 130 in accordance with switch signals from the control switches 111, and controls display of the display panel 112 of the design panel 110 in accordance with the operation state of the CD control unit 130. The length of the connector 131 is set to be fitted into the connector 123 on the circuit board 127 so that the CD control unit 130 is placed on the other sound unit 140.

The central control unit 120 has the connector 123 and a connector 124 which can be connected to the CD control unit 130 and the other sound unit 140. The central control unit 120 has the CPU 121, which systematically executes signal processes with the control switches 111, display panel 112, CD control unit 130, and the other sound unit 140 when the connector 123 of the central control unit 120 is connected to the connector 131 of the CD control unit 130 and the connector 124 of the central control unit 120 is connected to a connector 141 of the other sound unit 140. The central control unit 120 also has an AM/FM radio tuner 122 with a built-in amplifier.

The central control unit 120 is connected to the other sound unit 140 via the connector 124 of the central control unit 120 and the connector 141 of the other sound unit 140. The CPU 121 of the central control unit outputs control signals to the other sound unit 140 in accordance with switch signals from the control switches 111, and controls display of the display panel 112 of the design panel 110 in accordance with the operation state of the other sound unit 140.

Note that the central control unit 120, CD control unit 130, and other sound unit 140 may be connected by providing connectors to their rear end portions, as indicated by the dotted lines in FIG. 34.

The design panel 110, central control unit 120, CD control unit 130, and other sound unit 140 are attached to an attachment portion located between the driver seat and front passenger seat in an instrument panel on which meters such as a speedometer, and the like are placed, and which is located on the front side in the passenger room, and control members on the design panel 110 can be operated by the passenger.

The design panel 110 is connected to the sound units 120 to 140 to perform concentrated control of them in place of control switches normally provided to the individual sound modules.

With this arrangement, sound units which are individually mounted in a conventional system can be integrated, and design panels having different functions and designs are prepared in correspondence with different models of vehicles. Hence, the purchasing customer can choose a design panel from a broad range of design panels and can decorate the passenger room to his or her taste.

The central control unit 120 comprises the circuit board 127 on which the CPU 121, radio tuner 122, and connectors 123 and 124 are laid out, and is formed with attachment/detachment holes 125 and 126 which can attach/detach recording media such as a CD, cassette tape, MD, and the like used in the CD control unit 130 and other sound unit 140 from the passenger room side via the design panel 110. Normally, the CD control unit and sound unit which uses recording media such as a cassette tape and the like require openings at corresponding positions on the design panel. However, as the positions of such openings are limited by the passenger's convenience, the degree of freedom in layout of the sound units that use recording media becomes low, and the unit itself becomes large in size when a CPU that performs various control processes is added. However, in this embodiment, the central control unit 120 incorporates the CPU and also at least the radio tuner 122. Also, the sound unit is detachably connected to the central control unit via the connectors to be able to communicate with the CPU, performs attachment/detachment of a medium that records audio data, and reads out audio data. The design panel has an opening via which the recording medium is attached/detached. Therefore, since only the unit including the radio tuner becomes large in size, the degree of freedom in layout can be increased. Even when radio tuners are prepared to have different specifications in units of destination countries, i.e., frequencies, since the frequencies of radios vary depending on destination countries, control units which must also be prepared to have different specifications due to influences on control functions of a plurality of units including a radio tuner can be prepared together, thus improving productivity. Furthermore, since the radio tuner which can be prepared by only exchanging parts is provided to the central control unit, space savings and standardization of units can be easily achieved, and a storage space for the respective units can be assured without redesigning the central control unit even when different types of CD control unit and sound unit are used. Moreover, since the design panel or central control unit alone can be exchanged, a large number of parts need not be prepared in correspondence with a large number of kinds of specifications, designs, and safety measures.

In this manner, for regions in which different frequencies are used, the circuit board of the central control unit 120 can be exchanged, thus facilitating setups in units of destination countries.

The CD control unit 130 and other sound unit 140 attach/detach a CD, cassette, or MD that records audio data, and play back the audio data.

Electrical Arrangement

FIG. 35 is a block diagram showing the electrical arrangement of the vehicle electronic system shown in FIG. 34.

As shown in FIG. 35, the design panel 110 and central control unit 120 are electrically connected to each other via the connector 115 of the design panel 110, and the connector 128 of the central control unit 120, switch signals from the control switches 111 are input to the CPU 121 of the central control unit 120, and the CPU 121 controls display of the display panel 112 of the design panel 110.

The central control unit 120 and CD control unit 130 are electrically connected to each other via the connector 123 of the central control unit 120 and the connector 131 of the CD control unit 130, and the CPU 121 of the central control unit 120 outputs control signals to the CD control unit 130 in accordance with switch signals from the control switches 111 and controls display of the display panel 112 of the design panel 110 in accordance with the operation state of the CD control unit 130.

The central control unit 120 and other sound unit 140 are electrically connected to each other via the connector 124 of the central control unit 120 and the connector 141 of the other sound unit 140, and the CPU 121 of the central control unit 120 outputs control signals to the other sound unit 140 in accordance with switch signals from the control switches 111 and controls display of the display panel 112 of the design panel 110 in accordance with the operation state of the other sound unit 140.

Also, the CPU 121 of the central control unit controls the radio tuner 122 in accordance with switch signals from the control switches 111.

Attachment Structure

Figure 36:
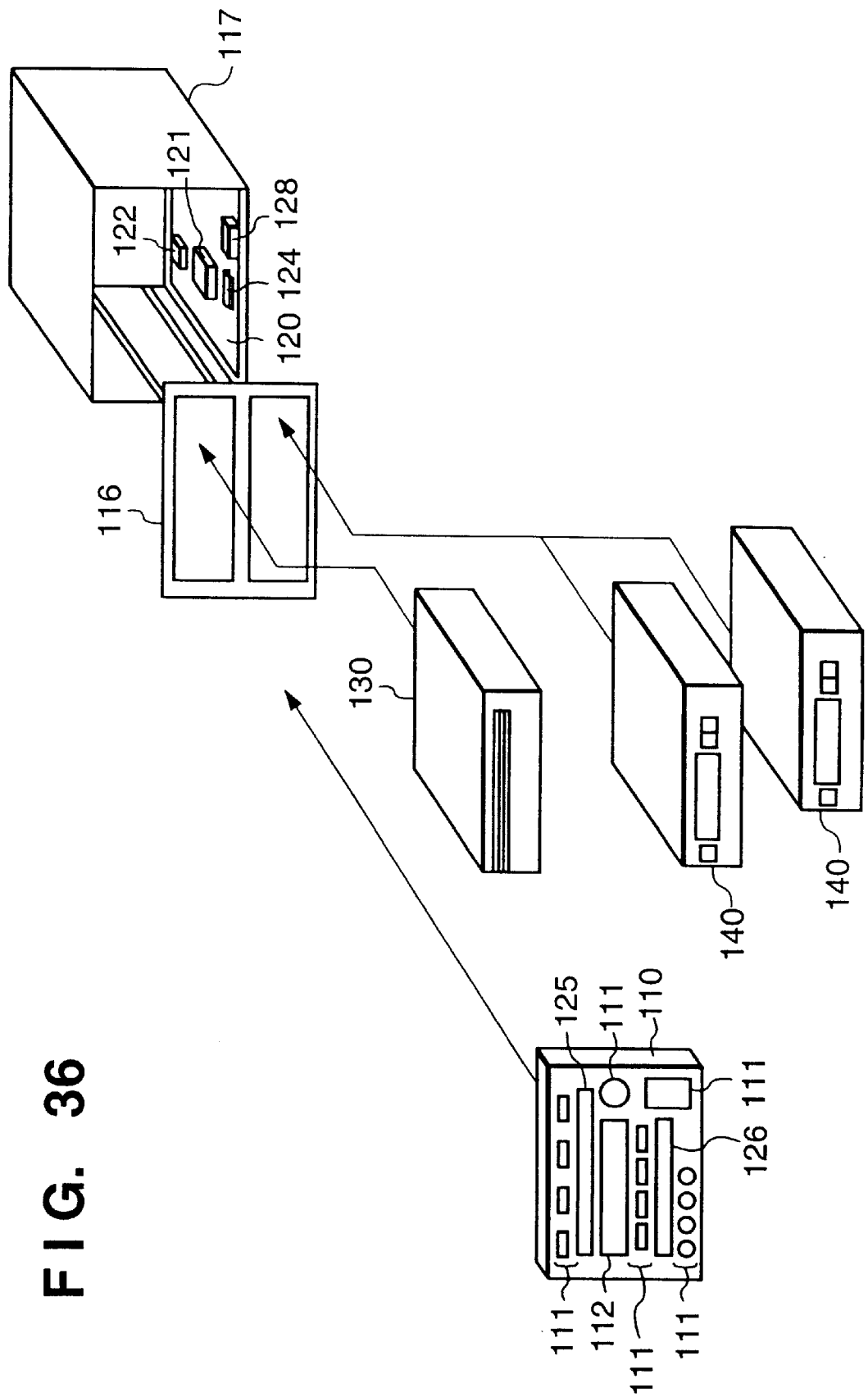
FIG. 36 is a perspective view for explaining the attachment structure of the vehicle electronic system of the second embodiment.

FIG. 36 is a perspective view for explaining the attachment structure of the vehicle electronic system of this embodiment.

As shown in FIG. 36, the central control unit 110, CD control unit 120, and other sound unit 140 are housed in a box-shaped frame 117 having a 2DIN size, and a cover 116 is attached to the front surface of the frame 117. The design panel 110 is fixed to the front surface of the cover 116 by, e.g., screws while the central control unit 110, CD control unit 120, and other sound unit 140 are housed in the box-shaped frame 117. The design panel 110 is electrically and detachably connected to the connector 128 of the central control unit 120 in the box-shaped frame 117.

In this way, the presence/absence of the CD control unit and other sound unit does not influence attachment of the system in the passenger room.

Note that the present invention can be applied to changes or modifications of the above embodiments within the scope of the invention.

The first to third electronic control units of the present invention include an air conditioner, and in such case, control switches for the air conditioner are provided to the control panel to control the air conditioner.

In the above example, the first electronic control unit 20 is an MD unit, and the second electronic control unit 30 is a CD unit, but the first electronic control unit 20 may be a CD unit and the second electronic control unit 30 may be an MD unit. In this case, the text display device 22 of the first electronic control unit (CD unit) displays display data of the CD unit, and also displays that of the MD unit.

Also, in addition to the sound unit such as a CD control unit or the like, a car navigation unit can be mounted.

Covers may be attached to the attachment/detachment holes 125 and 126 of the design panel, and may be removed in correspondence with option setups of the CD control unit 130 and other sound unit 140. Also, a plurality of types of design panels including a design panel for a radio alone having no attachment/detachment hole, and a design panel according to other option setups may be prepared.

The present invention is not limited to the above embodiments and various changes and modifications can be made within the spirit and scope of the present invention. Therefore, to apprise the public of the scope of the present invention the following claims are made.

What is claimed is:

1. A vehicle electronic system comprising:
   a first electronic control unit having a predetermined first control function;
   a second electronic control unit, which is formed independently of said first electronic control unit, and has a predetermined second control function different from the first control function, the second control function including a function of reading out information from a storage medium inserted from a passenger room side, and said second electronic control unit having an insertion hole for inserting the storage medium;
   a control panel, which is formed independently of said first and second electronic control units, comprises, on the passenger room side, a plurality of control switches for operating individual control functions pertaining to said first and second electronic control units, and a display device for making display of the individual control functions pertaining to said first and second electronic control units, and has a communication hole for inserting the storage medium in correspondence with the insertion hole;

a third electronic control unit, which is formed independently of said first and second electronic control units and said control panel, selects one of the control functions of said first and second electronic control units when one of the control switches is operated, outputs a control signal for operating the control function of the selected electronic control unit to the selected electronic control unit, and outputs a display control signal for making the display device of said control panel display upon receiving a display signal from one of said first and second electronic control units; and electrical connection means for electrically connecting between said first to third electronic control units, and said control panel, said first to third electronic control units being laid out adjacent to and parallel to each other on a side opposite to the passenger room of said control panel, wherein said third electronic control unit is laid out to be parallel to said first and second electronic control unit so as not to disturb a path between the insertion hole of said second electronic control unit and the communication hole of said control panel, and said electrical connection means independently comprises a first line for detachably connecting said first and third electronic control units via a connector, a second line for detachably connecting said second and third electronic control units via a connector, and a third line for connecting said control panel and said third electronic control unit.

2. The system according to claim 1, wherein said third electronic control unit is laid out at a position between said first and second electronic control units.

3. The system according to claim 2, further comprising a base chassis detachably fixed to a vehicle body, and wherein each of said control panel, and said first and second electronic control units is detachably fixed to said base chassis.

4. The system according to claim 2, wherein a projection which protrudes from a position near an end portion opposite to the passenger room toward a side where said first electronic control unit is placed is formed on said third electronic control unit, and forms a recess for housing said first electronic control unit in the neighborhood of said third electronic control unit.

5. The system according to claim 4, wherein said first to third electronic control units are vertically stacked to be parallel to each other on that side of said control panel, which is opposite to the passenger room, the projection protrudes downward from the position near that end portion of said third electronic control unit, which is opposite to the passenger room, and the projection forms the recess for housing said first electronic control unit under said third electronic control unit.

6. The system according to claim 1, wherein said third line detachably connects said control panel and said third electronic control unit via a connector.

7. The system according to claim 4, wherein a passenger room-side surface of said first electronic control unit has one of a first display unit and an insertion hole for inserting a storage medium from which said first electronic control unit reads out information, and one of the first display unit and insertion hole is laid out in the neighborhood of a passenger room-side surface of said control panel, and faces the interior of the passenger room to be substantially flush with the control panel surface.

8. The system according to claim 4, wherein a connector for connecting said third electronic control unit to the vehicle body is provided to the projection.

9. The system according to claim 5, wherein a connector to be electrically connected to said second electronic control unit is provided to an upper surface of the projection of said third electronic control unit.

10. The system according to claim 5, wherein said vehicle electronic system is laid out at a position between a driver seat and passenger sheet in an instrument panel, the control function of said first electronic control unit includes a function of reading out information from a storage medium inserted from the passenger room side, and the storage medium inserted into said first electronic control unit is smaller than a storage medium inserted into said second electronic control unit.

11. The system according to claim 2, wherein the connector of said first line is a first connector which is mounted on one surface of a circuit board built in said third electronic control unit and is to be electrically connected to said first electronic control unit, and the connector of said second line is a second connector which is mounted on the other surface of the circuit board and is to be electrically connected to said second electronic control unit.

12. The system according to claim 3, wherein said first to third electronic control units are vertically stacked to be parallel to each other on that side of said control panel, which is opposite to the passenger room, said base chassis has an open upper end and a lower end, and said first and second electronic control units are attached from above and below said base chassis.

13. The system according to claim 1, wherein the control function of said first electronic control unit has a function of reading out information from a storage medium inserted from the passenger room side, said first electronic control unit has a second insertion hole for inserting a storage medium from which said first electronic control unit reads out information, said control panel has a second communication hole for inserting the storage medium in correspondence with the second insertion hole, and said third electronic control unit is laid out to be parallel to said first and second electronic control units so as not to disturb a path between the second insertion hole of said first electronic control unit and the second communication hole of said control panel.

14. The system according to claim 3, wherein said base chassis has a reference attachment portion serving as a reference position upon attaching said first and second electronic control units, and an error allowing attachment portion which is formed at a position different from the reference attachment portion and allows a position error of said first and second electronic control units, and a connector of at least one of said first and second electronic control units is placed to be closer to the reference attachment portion than the error allowing attachment portion.

15. The system according to claim 5, wherein a heat radiation hole is formed on a housing of said first electronic control unit laid out under said third electronic control unit, and the heat radiation hole is formed at a position except for a portion corresponding to a control arithmetic unit built in said first electronic control unit.

16. The system according to claim 5, wherein a heat radiation hole is formed on a side surface of a housing of said first electronic control unit, and a heat radiation hole is formed on a side surface of the projection of said third electronic control unit at a position corresponding to the heat radiation hole of said first electronic control unit.

17. The system according to claim 1, wherein said first and second electronic control units respectively comprise drive means for driving storage media to read predetermined data from the storage media, and said third electronic control unit does not comprise any drive means for driving a storage medium to read predetermined data from the storage medium.

18. The system according to claim 1, wherein said third electronic unit incorporates at least a radio tuner.

19. The system according to claim 18, wherein said third electronic control unit comprises a circuit board, and a central processing unit for outputting the control signal and display control signal, and the radio tuner are laid out on said circuit board.

20. The system according to claim 18, wherein said first to third electronic control units are vertically stacked to be parallel to each other on that side of said control panel, which is opposite to the passenger room, and said third electronic control unit is placed below said first and second electronic control units.

* * * * *